US007713124B2

(12) United States Patent
Cuddy et al.

(10) Patent No.: US 7,713,124 B2
(45) Date of Patent: May 11, 2010

(54) GAMING SYSTEM AND METHOD FOR PROVIDING GROUP PLAY WITH DIVIDED BONUS FEATURES

(75) Inventors: Ryan W. Cuddy, Reno, NV (US); Anthony J. Baerlocher, Reno, NV (US); Carl V. Kniesteadt, Reno, NV (US); Dov Randall, Las Vegas, NV (US)

(73) Assignee: IGT, Reno, NV (US)

(*) Notice: Subject to any disclaimer, the term of this patent is extended or adjusted under 35 U.S.C. 154(b) by 269 days.

(21) Appl. No.: 11/830,044

(22) Filed: Jul. 30, 2007

(65) Prior Publication Data

US 2008/0020823 A1 Jan. 24, 2008

Related U.S. Application Data

(63) Continuation of application No. 11/557,394, filed on Nov. 7, 2006, which is a continuation-in-part of application No. 11/219,949, filed on Sep. 6, 2005, now Pat. No. 7,500,913.

(51) Int. Cl.
*A63F 9/24* (2006.01)
*A63F 13/00* (2006.01)

(52) U.S. Cl. ............................ 463/26; 463/16; 463/25; 463/42

(58) Field of Classification Search ............. 463/16–22, 463/25–28, 40–42
See application file for complete search history.

(56) References Cited

U.S. PATENT DOCUMENTS

| | | | |
|---|---|---|---|
| 3,633,915 | A | 1/1972 | Lippert |
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,409,656 | A | 10/1983 | Andersen et al. |
| 4,448,419 | A | 5/1984 | Telnaes |
| 4,494,197 | A | 1/1985 | Troy et al. |
| 4,573,681 | A | 3/1986 | Okada |

(Continued)

FOREIGN PATENT DOCUMENTS

AU 524709 9/1982

(Continued)

OTHER PUBLICATIONS

Aristrocrat Brochure, written by Aristocrat Gaming, published in 2004.

(Continued)

*Primary Examiner*—John M Hotaling, II
*Assistant Examiner*—Steven J. Hylinski
(74) *Attorney, Agent, or Firm*—K&L Gates LLP

(57) ABSTRACT

A gaming system including a central server linked to a plurality of gaming machines. Upon a suitable triggering event at a triggering gaming device in the gaming system a bonus event occurs. When the bonus event occurs, the players actively playing each auxiliary gaming device in the gaming system are each provided a chance to participate in the bonus event as well. Each remaining gaming device's chance of participating in the bonus event is based on the individual accumulated bonus event pool for that gaming device.

24 Claims, 14 Drawing Sheets

U.S. PATENT DOCUMENTS

| | | | |
|---|---|---|---|
| 4,582,324 | A | 4/1986 | Koza et al. |
| 4,624,459 | A | 11/1986 | Kaufman |
| 4,636,951 | A | 1/1987 | Harlick |
| 4,652,998 | A | 3/1987 | Koza et al. |
| 4,695,053 | A | 9/1987 | Vazquez, Jr. et al. |
| 4,721,307 | A | 1/1988 | Okada |
| 4,743,024 | A | 5/1988 | Helm et al. |
| 4,760,527 | A | 7/1988 | Sidley |
| 4,775,155 | A | 10/1988 | Lees |
| 4,805,907 | A | 2/1989 | Hagiwara |
| 4,837,728 | A | 6/1989 | Barrie et al. |
| 4,842,278 | A | 6/1989 | Markowicz |
| 4,856,787 | A | 8/1989 | Itkis |
| 4,871,171 | A | 10/1989 | Rivero |
| 4,880,237 | A | 11/1989 | Kishishita |
| 4,926,327 | A | 5/1990 | Sidley |
| 4,964,638 | A | 10/1990 | Ishida |
| 4,991,848 | A | 2/1991 | Greenwood et al. |
| 5,038,022 | A | 8/1991 | Lucero |
| 5,048,833 | A | 9/1991 | Lamle |
| 5,074,559 | A | 12/1991 | Okada |
| 5,116,055 | A | 5/1992 | Tracy |
| 5,123,649 | A | 6/1992 | Tiberio |
| 5,127,651 | A | 7/1992 | Okada |
| 5,158,293 | A | 10/1992 | Mullins |
| 5,178,390 | A | 1/1993 | Okada |
| 5,205,555 | A | 4/1993 | Hamano |
| 5,209,479 | A | 5/1993 | Nagao |
| 5,217,224 | A | 6/1993 | Sincock |
| 5,249,800 | A | 10/1993 | Hilgendorf et al. |
| 5,259,616 | A | 11/1993 | Bergmann |
| 5,265,874 | A | 11/1993 | Dickinson et al. |
| 5,275,400 | A | 1/1994 | Weingardt |
| 5,276,312 | A | 1/1994 | McCarthy |
| 5,277,424 | A | 1/1994 | Wilms |
| 5,280,909 | A | 1/1994 | Tracy |
| 5,286,023 | A | 2/1994 | Wood |
| 5,292,127 | A | 3/1994 | Kelly et al. |
| 5,321,241 | A | 6/1994 | Craine |
| 5,324,035 | A | 6/1994 | Morris et al. |
| 5,326,104 | A | 7/1994 | Pease et al. |
| 5,342,047 | A | 8/1994 | Heidel et al. |
| 5,342,049 | A | 8/1994 | Wichinsky et al. |
| 5,344,144 | A | 9/1994 | Canon |
| 5,351,970 | A | 10/1994 | Fioretti |
| 5,377,993 | A | 1/1995 | Josephs |
| 5,382,023 | A | 1/1995 | Roberts et al. |
| 5,393,057 | A | 2/1995 | Marnell, II |
| 5,398,932 | A | 3/1995 | Eberhardt et al. |
| 5,401,024 | A | 3/1995 | Simunek |
| 5,417,430 | A | 5/1995 | Breeding |
| 5,423,539 | A | 6/1995 | Nagao |
| 5,429,361 | A | 7/1995 | Raven et al. |
| 5,456,465 | A | 10/1995 | Durham |
| 5,470,079 | A | 11/1995 | LeStrange et al. |
| 5,472,194 | A | 12/1995 | Breeding et al. |
| 5,489,101 | A | 2/1996 | Moody |
| 5,511,781 | A | 4/1996 | Wood |
| 5,524,888 | A | 6/1996 | Heidel |
| 5,536,016 | A | 7/1996 | Thompson |
| 5,542,669 | A | 8/1996 | Charron et al. |
| 5,547,192 | A | 8/1996 | Ishibashi |
| 5,560,603 | A | 10/1996 | Seelig et al. |
| 5,564,700 | A * | 10/1996 | Celona ........................ 463/27 |
| 5,566,337 | A | 10/1996 | Szymanski |
| 5,570,885 | A | 11/1996 | Ornstein |
| 5,580,053 | A | 12/1996 | Crouch |
| 5,580,309 | A | 12/1996 | Piechowiak et al. |
| 5,584,763 | A | 12/1996 | Kelly et al. |
| 5,601,487 | A | 2/1997 | Oshima et al. |
| 5,611,535 | A | 3/1997 | Tiberio |
| 5,611,730 | A | 3/1997 | Weiss |
| 5,626,341 | A | 5/1997 | Jones |
| 5,645,486 | A | 7/1997 | Nagao et al. |
| 5,647,798 | A | 7/1997 | Falciglia |
| 5,655,961 | A | 8/1997 | Acres et al. |
| 5,674,128 | A | 10/1997 | Holch et al. |
| 5,702,304 | A | 12/1997 | Acres et al. |
| 5,707,285 | A | 1/1998 | Place et al. |
| 5,707,286 | A | 1/1998 | Carlson |
| 5,711,525 | A | 1/1998 | Breeding |
| 5,722,891 | A | 3/1998 | Inoue |
| 5,732,948 | A | 3/1998 | Yoseloff |
| 5,741,183 | A | 4/1998 | Acres et al. |
| 5,743,800 | A | 4/1998 | Huard et al. |
| 5,752,882 | A | 5/1998 | Acres et al. |
| 5,761,647 | A | 6/1998 | Boushy |
| 5,762,552 | A | 6/1998 | Vuong |
| 5,766,076 | A | 6/1998 | Pease et al. |
| 5,769,716 | A | 6/1998 | Saffari et al. |
| 5,772,509 | A | 6/1998 | Weiss |
| 5,772,511 | A | 6/1998 | Smeltzer |
| RE35,864 | E | 7/1998 | Weingardt |
| 5,775,692 | A | 7/1998 | Watts et al. |
| 5,779,545 | A | 7/1998 | Berg et al. |
| 5,779,549 | A | 7/1998 | Walker et al. |
| 5,788,573 | A | 8/1998 | Baerlocher et al. |
| 5,800,269 | A | 9/1998 | Holch et al. |
| 5,806,855 | A | 9/1998 | Cherry |
| 5,807,172 | A | 9/1998 | Piechowiak |
| 5,816,918 | A | 10/1998 | Kelly et al. |
| 5,820,459 | A | 10/1998 | Acres et al. |
| 5,823,874 | A | 10/1998 | Adams |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,848,932 | A | 12/1998 | Adams |
| 5,851,011 | A | 12/1998 | Lott |
| 5,851,147 | A | 12/1998 | Stupak et al. |
| 5,851,148 | A | 12/1998 | Brune et al. |
| 5,851,149 | A | 12/1998 | Xidos et al. |
| 5,855,514 | A | 1/1999 | Kamille |
| 5,855,515 | A | 1/1999 | Pease et al. |
| 5,873,781 | A | 2/1999 | Keane |
| 5,876,284 | A | 3/1999 | Acres et al. |
| 5,882,261 | A | 3/1999 | Adams |
| 5,885,158 | A | 3/1999 | Torango et al. |
| 5,902,184 | A | 5/1999 | Bennett et al. |
| 5,910,048 | A | 6/1999 | Feinberg |
| 5,911,418 | A | 6/1999 | Adams |
| 5,919,088 | A | 7/1999 | Weiss |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,980,384 | A | 11/1999 | Barrie |
| 5,984,781 | A | 11/1999 | Sunaga |
| 5,989,121 | A | 11/1999 | Sakamoto |
| 5,993,316 | A | 11/1999 | Coyle et al. |
| 5,997,400 | A | 12/1999 | Seelig et al. |
| 5,997,401 | A | 12/1999 | Crawford |
| 6,001,016 | A | 12/1999 | Walker et al. |
| 6,004,207 | A | 12/1999 | Wilson, Jr. et al. |
| 6,007,427 | A | 12/1999 | Wiener |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura |
| 6,039,648 | A | 3/2000 | Guinn et al. |

6,039,649 A 3/2000 Schulze
6,048,269 A 4/2000 Burns et al.
6,050,895 A 4/2000 Luciano et al.
6,056,642 A 5/2000 Bennett
6,059,289 A 5/2000 Vancura
6,059,658 A 5/2000 Mangano et al.
6,062,980 A 5/2000 Luciano
6,068,552 A 5/2000 Walker et al.
6,068,553 A 5/2000 Parker
6,077,162 A * 6/2000 Weiss .......................... 463/26
6,089,976 A 7/2000 Schneider et al.
6,089,977 A 7/2000 Bennett
6,089,978 A 7/2000 Adams
6,089,980 A 7/2000 Gauselmann
6,093,102 A 7/2000 Bennett
6,099,408 A 8/2000 Schneier et al.
6,102,798 A 8/2000 Bennett
6,110,041 A 8/2000 Walker et al.
6,110,043 A 8/2000 Olsen
6,117,013 A 9/2000 Eiba
6,120,031 A 9/2000 Adams
6,126,541 A 10/2000 Fuchs
6,126,542 A 10/2000 Fier
6,135,884 A 10/2000 Hedrick et al.
6,142,872 A 11/2000 Walker et al.
6,142,873 A 11/2000 Weiss et al.
6,142,874 A 11/2000 Kodachi et al.
6,142,875 A 11/2000 Kodachi et al.
6,146,270 A 11/2000 Huard et al.
6,146,273 A 11/2000 Olsen
6,149,156 A 11/2000 Feola
6,149,521 A 11/2000 Sanduski
6,152,823 A 11/2000 Lacoste et al.
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,162,122 A 12/2000 Acres et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,183,366 B1 2/2001 Goldberg et al.
6,186,894 B1 2/2001 Mayeroff
6,190,254 B1 2/2001 Bennett
6,190,255 B1 2/2001 Thomas et al.
6,203,010 B1 3/2001 Jorasch et al.
6,203,429 B1 3/2001 Demar et al.
6,203,430 B1 3/2001 Walker et al.
6,206,374 B1 3/2001 Jones
6,206,782 B1 3/2001 Walker et al.
6,210,275 B1 4/2001 Olsen
6,210,277 B1 4/2001 Stefan
6,210,279 B1 4/2001 Dickinson
6,213,876 B1 4/2001 Moore, Jr.
6,217,448 B1 4/2001 Olsen
6,224,482 B1 5/2001 Bennett
6,224,483 B1 5/2001 Mayeroff
6,224,484 B1 5/2001 Okuda et al.
6,231,442 B1 5/2001 Mayeroff
6,231,445 B1 5/2001 Acres
6,238,288 B1 5/2001 Walker et al.
6,241,608 B1 6/2001 Torango
6,244,958 B1 6/2001 Acres
6,254,483 B1 7/2001 Acres
6,257,981 B1 7/2001 Acres et al.
6,261,177 B1 7/2001 Bennett
6,264,557 B1 7/2001 Schneier et al.
6,270,409 B1 8/2001 Shuster
6,293,866 B1 9/2001 Walker et al.
RE37,414 E 10/2001 Harlick
6,302,790 B1 10/2001 Brossard
6,302,793 B1 10/2001 Fertitta, III et al.
6,305,686 B1 10/2001 Perrie et al.
6,309,298 B1 10/2001 Gerow
6,309,300 B1 10/2001 Glavich
6,311,976 B1 11/2001 Yoseloff et al.
6,312,330 B1 11/2001 Jones et al.
6,312,332 B1 11/2001 Walker et al.
6,312,333 B1 11/2001 Acres
6,312,334 B1 11/2001 Yoseloff
6,315,662 B1 11/2001 Jorasch et al.
6,319,122 B1 11/2001 Packes, Jr. et al.
6,319,125 B1 11/2001 Acres
6,328,649 B1 12/2001 Randall et al.
6,331,143 B1 12/2001 Yoseloff
6,334,814 B1 1/2002 Adams
6,336,857 B1 1/2002 McBride
6,340,158 B2 1/2002 Preice et al.
6,346,043 B1 2/2002 Colin et al.
6,347,996 B1 2/2002 Gilmore et al.
6,358,147 B1 3/2002 Jaffe et al.
6,358,149 B1 3/2002 Schneider et al.
6,361,441 B1 3/2002 Walker et al.
6,364,766 B1 4/2002 Anderson et al.
6,364,768 B1 4/2002 Acres et al.
6,364,769 B1 4/2002 Weiss et al.
6,371,852 B1 4/2002 Acres
6,375,187 B1 4/2002 Baerlocher
6,375,567 B1 4/2002 Acres
6,375,568 B1 4/2002 Roffman et al.
6,375,569 B1 4/2002 Acres
6,398,218 B1 6/2002 Vancura
6,406,369 B1 6/2002 Baerlocher et al.
6,416,408 B2 7/2002 Tracy et al.
6,416,409 B1 7/2002 Jordan
6,419,579 B1 7/2002 Bennett
6,419,583 B1 7/2002 Crumby et al.
6,428,412 B1 8/2002 Anderson et al.
6,431,983 B2 8/2002 Acres
6,435,511 B1 8/2002 Vancura et al.
6,435,968 B1 8/2002 Torango
6,439,995 B1 8/2002 Hughs-Baird et al.
6,454,651 B1 9/2002 Yoseloff
RE37,885 E 10/2002 Acres et al.
6,461,241 B1 10/2002 Webb et al.
6,471,208 B2 10/2002 Yoseloff et al.
6,471,591 B1 10/2002 Crumby
6,481,713 B2 11/2002 Perrie et al.
6,503,146 B2 1/2003 Walker et al.
6,506,118 B1 1/2003 Baerlocher et al.
6,533,664 B1 3/2003 Crumby
6,537,150 B1 3/2003 Luciano et al.
6,561,904 B2 5/2003 Locke et al.
6,565,434 B1 5/2003 Acres
6,569,015 B1 5/2003 Baerlocher et al.
6,572,471 B1 6/2003 Bennett
6,575,832 B1 6/2003 Manfredi et al.
6,585,592 B1 7/2003 Crumby
6,589,115 B2 7/2003 Walker et al.
6,592,460 B2 7/2003 Torango
6,595,853 B1 7/2003 Osawa
6,599,190 B2 7/2003 Osawa
6,599,193 B2 7/2003 Baerlocher et al.
6,602,137 B2 8/2003 Kaminkow et al.
6,607,438 B2 8/2003 Baerlocher et al.
6,607,441 B1 8/2003 Acres
6,609,973 B1 8/2003 Weiss
6,620,046 B2 9/2003 Rowe
6,626,758 B1 9/2003 Parham et al.
6,632,141 B2 10/2003 Webb et al.
6,634,944 B2 10/2003 Osawa
6,645,077 B2 11/2003 Rowe

| | | | | |
|---|---|---|---|---|
| 6,648,753 | B1 | 11/2003 | Tracy et al. | |
| 6,648,754 | B2 | 11/2003 | Baerlocher et al. | |
| 6,648,759 | B2 | 11/2003 | Vancura | |
| 6,652,378 | B2 | 11/2003 | Cannon et al. | |
| 6,656,047 | B1 | 12/2003 | Tarantino et al. | |
| 6,656,048 | B2 * | 12/2003 | Olsen | 463/25 |
| 6,656,052 | B2 | 12/2003 | Abramopoulos et al. | |
| 6,675,152 | B1 | 1/2004 | Prasad et al. | |
| 6,692,354 | B2 | 2/2004 | Tracy et al. | |
| 6,692,355 | B2 | 2/2004 | Baerlocher et al. | |
| 6,712,695 | B2 | 3/2004 | Mothwurf et al. | |
| 6,712,697 | B2 | 3/2004 | Acres | |
| 6,712,699 | B2 | 3/2004 | Walker et al. | |
| 6,719,630 | B1 | 4/2004 | Seelig et al. | |
| 6,733,386 | B2 | 5/2004 | Cuddy et al. | |
| 6,733,390 | B2 | 5/2004 | Walker et al. | |
| 6,749,510 | B2 | 6/2004 | Giobbi | |
| 6,776,714 | B2 | 8/2004 | Ungaro et al. | |
| 6,776,715 | B2 | 8/2004 | Price | |
| 6,800,030 | B2 | 10/2004 | Acres | |
| 6,805,352 | B2 | 10/2004 | Hunter | |
| 6,832,958 | B2 | 12/2004 | Acres et al. | |
| 6,837,788 | B2 | 1/2005 | Cannon | |
| 6,887,154 | B1 * | 5/2005 | Luciano et al. | 463/26 |
| 6,899,625 | B2 | 5/2005 | Luciano, Jr. et al. | |
| 6,910,964 | B2 | 6/2005 | Acres | |
| 6,918,834 | B2 | 7/2005 | Vancura | |
| 6,939,234 | B2 | 9/2005 | Beatty | |
| RE38,812 | E | 10/2005 | Acres et al. | |
| 6,966,834 | B1 * | 11/2005 | Johnson | 463/25 |
| 6,991,544 | B2 | 1/2006 | Soltys et al. | |
| 7,004,466 | B2 | 2/2006 | Gauselmann | |
| 7,008,319 | B2 | 3/2006 | Montgomery et al. | |
| 7,008,324 | B1 | 3/2006 | Johnson et al. | |
| 7,056,215 | B1 | 6/2006 | Olive | |
| 7,066,813 | B1 | 6/2006 | Sakamoto et al. | |
| 7,077,746 | B2 | 7/2006 | Torango | |
| 7,147,557 | B1 | 12/2006 | Tracy et al. | |
| 7,167,142 | B2 | 1/2007 | Buckley et al. | |
| 7,169,041 | B2 | 1/2007 | Tessme et al. | |
| 7,172,505 | B2 | 2/2007 | Vancura | |
| 7,297,059 | B2 * | 11/2007 | Vancura et al. | 463/27 |
| 7,311,598 | B2 | 12/2007 | Kaminkow et al. | |
| 7,311,604 | B2 | 12/2007 | Kaminkow et al. | |
| 7,361,085 | B2 * | 4/2008 | Packes et al. | 463/16 |
| 7,485,043 | B2 | 2/2009 | Beaulieu et al. | |
| 7,500,915 | B2 * | 3/2009 | Wolf et al. | 463/27 |
| 7,530,896 | B2 * | 5/2009 | Gauselmann | 463/27 |
| 2001/0004607 | A1 | 6/2001 | Olsen | |
| 2001/0018361 | A1 | 8/2001 | Acres | |
| 2001/0036857 | A1 | 11/2001 | Mothwurf et al. | |
| 2001/0049303 | A1 | 12/2001 | Found | |
| 2001/0055990 | A1 | 12/2001 | Acres | |
| 2002/0016202 | A1 | 2/2002 | Fertitta, III et al. | |
| 2002/0039923 | A1 | 4/2002 | Cannon et al. | |
| 2002/0058546 | A2 | 5/2002 | Acres | |
| 2002/0138594 | A1 | 9/2002 | Rowe | |
| 2002/0152120 | A1 | 10/2002 | Howington | |
| 2002/0165023 | A1 | 11/2002 | Brosnan et al. | |
| 2002/0177483 | A1 | 11/2002 | Cannon | |
| 2003/0003981 | A1 | 1/2003 | Valenti | |
| 2003/0024297 | A1 | 2/2003 | McMurtry | |
| 2003/0027625 | A1 | 2/2003 | Rowe | |
| 2003/0027630 | A1 | 2/2003 | Kelly et al. | |
| 2003/0045350 | A1 | 3/2003 | Baerlocher et al. | |
| 2003/0060266 | A1 | 3/2003 | Baerlocher | |
| 2003/0060279 | A1 | 3/2003 | Torango | |
| 2003/0092484 | A1 | 5/2003 | Schneider et al. | |
| 2003/0100361 | A1 | 5/2003 | Sharpless et al. | |
| 2003/0109307 | A1 | 6/2003 | Boyd | |
| 2003/0119581 | A1 | 6/2003 | Cannon et al. | |
| 2003/0144965 | A1 | 7/2003 | Prasad et al. | |
| 2003/0148804 | A1 | 8/2003 | Ikeya et al. | |
| 2003/0148807 | A1 | 8/2003 | Acres | |
| 2003/0222402 | A1 | 12/2003 | Olive | |
| 2003/0224852 | A1 | 12/2003 | Walker et al. | |
| 2003/0228904 | A1 | 12/2003 | Acres et al. | |
| 2004/0009811 | A1 | 1/2004 | Torango | |
| 2004/0072613 | A1 | 4/2004 | Visocnik | |
| 2004/0072615 | A1 | 4/2004 | Maya et al. | |
| 2004/0087368 | A1 | 5/2004 | Gavselmann | |
| 2004/0102243 | A1 | 5/2004 | Olsen | |
| 2004/0142742 | A1 | 7/2004 | Schneider et al. | |
| 2004/0214628 | A1 | 10/2004 | Boyd et al. | |
| 2004/0229683 | A1 | 11/2004 | Mothwurf et al. | |
| 2004/0242297 | A1 | 12/2004 | Walker | |
| 2005/0026669 | A1 | 2/2005 | Nelson et al. | |
| 2005/0032573 | A1 | 2/2005 | Acres et al. | |
| 2005/0054430 | A1 * | 3/2005 | Pitman et al. | 463/25 |
| 2005/0070356 | A1 | 3/2005 | Mothwurf | |
| 2005/0079911 | A1 | 4/2005 | Nakatsu | |
| 2005/0119044 | A1 | 6/2005 | Lim et al. | |
| 2005/0119047 | A1 | 6/2005 | Olive | |
| 2005/0143168 | A1 | 6/2005 | Torango | |
| 2005/0159211 | A1 | 7/2005 | Englman | |
| 2005/0176488 | A1 | 8/2005 | Olive | |
| 2005/0192083 | A1 | 9/2005 | Iwamoto | |
| 2005/0209004 | A1 | 9/2005 | Torango | |
| 2005/0239542 | A1 | 10/2005 | Olsen | |
| 2005/0267610 | A1 | 12/2005 | Shinoda | |
| 2006/0003829 | A1 | 1/2006 | Thomas | |
| 2006/0009285 | A1 | 1/2006 | Pryzby et al. | |
| 2006/0009291 | A1 | 1/2006 | Martin et al. | |
| 2006/0025210 | A1 | 2/2006 | Johnson | |
| 2006/0030403 | A1 | 2/2006 | Lafky et al. | |
| 2006/0040723 | A1 | 2/2006 | Baerlocher et al. | |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0046821 | A1 | 3/2006 | Kaminkow et al. | |
| 2006/0046822 | A1 | 3/2006 | Kaminkow et al. | |
| 2006/0046823 | A1 | 3/2006 | Kaminkow et al. | |
| 2006/0052158 | A1 | 3/2006 | Raniere | |
| 2006/0073870 | A1 | 4/2006 | Cannon | |
| 2006/0084502 | A1 | 4/2006 | Downs, III et al. | |
| 2006/0116201 | A1 | 6/2006 | Gauselmann | |
| 2007/0015585 | A1 | 1/2007 | Sartini et al. | |
| 2007/0054728 | A1 | 3/2007 | Hood | |
| 2007/0060316 | A1 | 3/2007 | O'Halloran | |
| 2007/0105619 | A1 | 5/2007 | Kniesteadt et al. | |
| 2007/0149292 | A1 | 6/2007 | Kaminkow et al. | |
| 2007/0202943 | A1 | 8/2007 | Thomas | |
| 2007/0207850 | A1 | 9/2007 | Darrah et al. | |
| 2008/0020817 | A1 | 1/2008 | Kaminkow et al. | |
| 2008/0020842 | A1 | 1/2008 | Kaminkow et al. | |
| 2008/0214263 | A1 | 9/2008 | Walker et al. | |

FOREIGN PATENT DOCUMENTS

| | | | |
|---|---|---|---|
| AU | 555905 | | 10/1986 |
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 70247/96 | | 4/1997 |
| AU | 680920 | | 8/1997 |
| AU | A-50327/96 | | 10/1997 |
| AU | A-63553/98 | | 10/1998 |
| AU | 199884162 | B2 | 3/1999 |
| AU | 707687 | | 7/1999 |

| | | | |
|---|---|---|---|
| AU | 709724 | | 9/1999 |
| AU | 199917318 | A1 | 9/1999 |
| AU | 711501 | | 10/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | A4 | 11/2001 |
| AU | 2001 1000033 | A4 | 11/2001 |
| AU | 749222 | | 6/2002 |
| AU | 754689 | | 11/2002 |
| AU | 758306 | | 3/2003 |
| AU | 199943453 | C | 4/2003 |
| DE | 3917683 | | 12/1990 |
| DE | 4200254 | | 8/1993 |
| EP | 0 342 797 | | 11/1989 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 2118445 | | 11/1983 |
| GB | 2 137 392 | A | 10/1984 |
| GB | 2 139 390 | | 11/1984 |
| GB | 2 147 773 | | 5/1985 |
| GB | 2 148 135 | | 5/1985 |
| GB | 1 151 054 | A | 7/1985 |
| GB | 2 153 572 | A | 8/1985 |
| GB | 2231189 | | 11/1990 |
| GB | 2 282 690 | | 4/1995 |
| GB | 2 328 311 | | 2/1999 |
| GB | 2 387 703 | | 10/2003 |
| JP | 7148307 | | 6/1995 |
| SU | 748263 | | 5/2002 |
| WO | WO 94/12256 | | 6/1994 |
| WO | WO 95/22811 | | 8/1995 |
| WO | WO 95/30944 | | 11/1995 |
| WO | WO 97 12338 | | 4/1997 |
| WO | WO 97/27568 | | 7/1997 |
| WO | WO 9732285 | | 9/1997 |
| WO | WO 98/35309 | | 8/1998 |
| WO | WO 98/47115 | | 10/1998 |
| WO | WO 98/51384 | | 11/1998 |
| WO | WO 99/03078 | | 1/1999 |
| WO | WO 99/10849 | | 3/1999 |
| WO | WO 00/12186 | | 3/2000 |
| WO | WO 00/32286 | | 6/2000 |
| WO | WO 01/10523 | | 2/2001 |
| WO | WO 01/15055 | | 3/2001 |
| WO | WO 01/15790 | A1 | 3/2001 |
| WO | PCT/US02/30858 | | 4/2003 |
| WO | WO 03/075235 | | 9/2003 |
| WO | WO 2004/066061 | A2 | 8/2004 |
| WO | WO 2005 076193 | | 8/2005 |
| WO | WO 2005/081623 | A2 | 9/2005 |
| WO | WO 2005/083599 | A1 | 9/2005 |
| WO | WO 2005/099425 | A2 | 10/2005 |
| WO | WO 2005/099845 | A1 | 10/2005 |
| WO | WO 2005/106702 | | 11/2005 |
| WO | WO 2005 113093 | | 12/2005 |

OTHER PUBLICATIONS

Auction Fever Advertisement, written by Sierre Design Group, available prior to 2004.

Bally Slot Machines Electro-Mechanicals 1964-1980 Book [In Part], Revised 3rd Edition written by Marshall Fey.

Believe it or Not Article, written by Strictly Slots, published in 2001.

Bingo Advertisement and Jackpot Bingo Advertisements, written by Casino Data Systems, published in 1998 and 2001.

Bonus Spin Diamond Fives Advertisement, written by IGT, published in 1999.

Bonus Times Article, written by Strictly Slots, published in Jul. 2000.

Boom Advertisement, written by WMS Gaming, Inc., published in 1998.

Cartoon Jackpots description, printed from www.ballygaming.com/home.asp, on Feb. 4, 2005.

Cash Box Advertisement, written by Anchor Games, published in 2000.

Cash Express Advertisements, written by Aristocrat, published in 2002.

Catalogue of Champions Advertisement, written by Aristocrat, published in 1990.

Computa Game Equipment Manual written and compiled by Russell Campbell, Sep. 1990.

Computa Game, "The Software Manual", Revision 3 for Computa Game Software Version 2.41 written by Clive Davis et al., published by Computa Game Pty Ltd., Jul. 1991.

Court Ruling on Claim Construction in *Cynthia Jean Goff* v. *Harrah's Operating Company, Inc.*, et al., dated Dec. 30, 2005.

Fast Buck Systems Manual, written by International Game Technology, available to Mirage shift supervisors at least as early as May 30, 1990.

Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).

Lemons, Cherries and Bell-Fruit-Gum, pp. 1 to 4 and 304 to 314, written by Bueschel, published in Royal Bell Books in Nov. 1995.

Mikohn Product Catalog, Chapters 1, 2, 6, 7 and 8, written by Mikohn, published in Jan. 1993.

Mikohn Supper Controller Manual, Chapters 1 to 3 and 6 to 7, written by Mikohn, published in 1989.

M-Slot Series Primary Reel Product description from Lemons, Cherries and Bell-Fruit-Gum, written by Richard M. Bueschel, published in 1995.

PEM—Precision Electronic Meter, written by GRIPS Electronic GmbH, printed from website reported as archived on Feb. 20, 1997 (available at http://web.archive.org/web/19970220165753/www.grips.com/pem.htm).

Player Tracking on Slots, written by GRIPS Electronic GmbH, printed from website reported as archived on Feb. 20, 1997 (available at http://web.archive.org/web/19970220165921/www.grips.com/playtrac.htm).

ProLINK Progressive Controller User/Reference Manual, written by Casino Data Systems, published in Apr. 1997.

Statement of Grounds and Particulars in Support of Opposition, from Australian Patent Application 754689 in the name of Aristocrat Technologies Australia Pty Ltd. and Opposition thereto by Acres Gaming, Inc., dated May 21, 2003.

Statutory Declaration of John Boris Golja from Australian Patent Application 754689 in the name of Aristocrat Technologies Australia Pty Ltd. and Opposition thereto by Acres Gaming, Inc., dated May 21, 2004.

Statutory Declaration of Phillip Charles Dimond, from Australian Patent Application 754689 in the name of Aristocrat Technologies Australia Pty Ltd. and Opposition thereto by Acres Gaming, Inc., dated Mar. 2, 2005.

Statutory Declaration of Scott Olive, from In the matter of Aristocrat Technologies Australia Pty Ltd. Opposition to Patent Application 765084 Acres Gaming Inc., dated May 9, 2005.

Surprize Gaming Machine Advertisement, written by Aristocrat Leisure Industries, Australia, published prior to 2004.

Surprize Software Specification for MV2030—var 01, written by Aristocrat Leisure Industries, Australia, published prior to 2004.

U.S. Appl. No. 60/035,513 by Torango and Lannoy, filed Jan. 15, 1997 and referenced by U.S. Patent Nos. 6,435,968, 6,241,608 and 6,592,460.

U.S. Appl. No. 60/040,982 by Torango and Lannoy, filed Mar. 17, 1997 and referenced by U.S. Patent Nos. 6,435,968, 6,241,608 and 6,592,460.
U.S. Appl. No. 60/050,971 by Torango and Lannoy, filed Jun. 19, 1997 and referenced by U.S. Patent Nos. 6,435,968, 6,241,608 and 6,592,460.
Wide Area Progressive Link System, written by GRIPS Electronic GmbH, printed from website reported as archived on Feb. 20, 1997 (available at http://web.archive.org/web/19970220165457/www.grips.com/wap.htm).

* cited by examiner

FIG. 9

| GAMING MACHINE | WAGERED MONETARY UNITS | TOTAL APPLICABLE ACCUMULATION WAGER POOL | PERCENTAGE OF REMAINDER OF SECONDARY EVENT AWARD |
|---|---|---|---|
| 14a | 50 | 155 | 32% |
| 14c | 100 | 155 | 65% |
| 14z | 5 | 155 | 3% |

FIG. 10

| GAMING MACHINE | ACCUMULATED BONUS EVENT POOL | TOTAL ACCUMULATION WAGER POOL | PERCENTAGE OF REMAINDER OF SECONDARY EVENT AWARD |
|---|---|---|---|
| 14a | 50 | 238 | 21% |
| 14b | 83 | 238 | 35% |
| 14c | 100 | 238 | 42% |
| 14z | 5 | 238 | 2% |

GAMING SYSTEM AND METHOD FOR PROVIDING GROUP PLAY WITH DIVIDED BONUS FEATURES

PRIORITY CLAIM

This application is a continuation patent application of, claims priority to and the benefit of U.S. patent application Ser. No. 11/557,394, filed on Nov. 7, 2006, which is a continuation-in-part application of, claims priority to and the benefit of U.S. patent application Ser. No. 11/219,949, filed on Sep. 6, 2005, the entire contents of which are incorporated herein.

This application relates to the following co-pending commonly owned patent applications: "GAMING SYSTEM WHICH PROVIDES MULTIPLE PLAYERS MULTIPLE BONUS AWARDS," Ser. No. 11/557,437; "GAMING SYSTEM AND METHOD FOR PROVIDING MULTIPLE PLAYERS MULTIPLE BONUS AWARDS," Ser. No. 11/557,412; "GAMING SYSTEM WHICH PROVIDES MULTIPLE PLAYERS MULTIPLE BONUS AWARDS," Ser. No. 11/830,030; "GAMING SYSTEM AND METHOD FOR PROVIDING MULTIPLE PLAYERS MULTIPLE BONUS AWARDS," Ser. No. 11/830,035; "GAMING SYSTEM AND METHOD FOR PROVIDING MULTIPLE PLAYERS MULTIPLE BONUS AWARDS," Ser. No. 11/830,056; and "GAMING SYSTEM WHICH PROVIDES MULTIPLE PLAYERS MULTIPLE BONUS AWARDS," Ser. No. 11/830,064.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary. For instance, the gaming machine may allow the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to one-hundred-twenty-five credits (e.g., five credits on each of twenty-five separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Certain secondary or bonus games are activated automatically. Other secondary or bonus games require player activation. Once activated, certain secondary or bonus games play to the end or final bonus award automatically. Other secondary or bonus games require at least some level of player interaction which may vary. In certain secondary or bonus games, the player may need to pick selections. In some secondary or bonus games, the player is required to make one or more decisions, such as whether to risk one amount for a higher amount. From the triggering of these secondary or bonus games to the end of these secondary or bonus games, the player is generally provided indications, instructions and information about the play of these secondary or bonus games. These indications, instructions and information inform the player of how and why the player is obtaining or has obtained any award(s) in the secondary or bonus game. Gaming machines often include a display device, such as one or more reels, wheels, dice, video display screens, to display how and why the player is obtaining the secondary or bonus award.

Certain awards are also available to multiple gaming machines or groups of gaming machines. These awards are sometimes displayed on a single display for multiple gaming machines. For instance, progressive awards associated with gaming machines are also known. In one form, a progressive award is an award amount which includes an initial amount funded by a casino and an additional amount funded through a portion of each wager made on the progressive award associated gaming machine. For example, 1% of each wager on the primary game of the gaming machine may be allocated to the progressive award or progressive award fund. Individual progressive slot machines have a self-contained jackpot, wherein the jackpot grows with every play. A linked progressive gaming system includes two or more slot machines connected to a common jackpot, each of which individually contribute to the jackpot.

The progressive award grows in value as more players play the gaming machine and more portions of the players' wagers are allocated to the progressive award. The jackpots can reach sizeable amounts such as $1 million or much higher amounts before a player hits or wins the jackpot. Such sizeable jackpots are very attractive to players. As the jackpot grows, so does the overall expected payout percentage of the game. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award as described above. These progressive awards enable multiple players to build a potential award as game play continues.

The multiple gaming machines which may win a progressive award may be in the same bank of machines, in the same casino, in the same gaming establishment (usually through a local area network ("LAN")), in two or more different casinos or in two or more different gaming establishments (usually through a wide area network ("WAN")). Such progressive awards are sometimes called local area progressives ("LAP") and wide area progressives ("WAP"), respectively. Moreover, a gaming machine or bank of gaming machines may be simultaneously associated with a plurality of progressive awards. In these multi-level progressive ("MLP") configurations, a plurality of progressive awards start at different award or value levels, such as $10, $100, $1000 and $10,000 and each individually increment or increase until provided to a player. Upon a suitable triggering event at least one of the gaming devices associated with the MLP, one or more of the progressive awards which form the MLP are provided to at least one of the players at such gaming devices.

Regardless of the type of progressive, known gaming machines typically require the player to play the maximum bet to be eligible to win the progressive jackpot. Even on a single payline dollar machine, the maximum bet can be $5 (max bet on many slot machines is 5 credits per payline). Many players who are not willing to wager the required amount, or not consistently willing to wager such an amount, are thus excluded from having an opportunity to win the progressive jackpot and enjoy its associated payout increase.

While such bonus awards are popular amongst players, a number of problems exist with these known gaming systems. First, only one person typically wins the bonus award. This may discourage the other players who have been also been playing for a long period of time. Additionally, when a bonus award is won, the other players often have a difficult time figuring out who won the bonus award.

Certain secondary or bonus games include a group gaming aspect wherein a plurality of players participate in a group event for one or more bonus awards. These group events often include a plurality of player's that are classified as actively playing eligible gaming machines in the gaming system. However, as players frequently keep their level of game play at the minimum amount required to remain classified as actively playing an eligible gaming machine, player's outcomes in the group event often do not correspond with player's level of play prior to the group event. This skews the outcome or award distribution in group events to such players that keep their level of game play at the minimum amount required to remain active. Accordingly, there is a need to provide a gaming system with a group event, wherein each active player's outcome in the group event is based, at least in part, on that player's relative level of game play.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and 6,565,434 describe mystery bonus awards and certain methods for providing such awards to players. These patents also describe certain methods for determining which gaming machines will provide the awards to players. These patents further describe methods for a central server to determine which gaming machines will provide the bonus awards and the amount of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player, if there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before allowing the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

There is a continuing need to provide new and different gaming machines and gaming systems as well as new and different ways to provide awards to players including bonus awards. There is also a continuing need to provide new and different linked or related gaming machines. Moreover, there is a continuing need to provide gaming machines and gaming systems which provide new and different features relating to group gaming.

SUMMARY

In one embodiment, the gaming system disclosed herein includes a central server, central controller or remote host in communication with or linked to a plurality of gaming machines or gaming devices. In another embodiment, the gaming system includes a plurality of linked gaming machines, wherein one of the gaming machines functions as the central server, central controller or remote host.

In one embodiment, upon a suitable triggering event at a first gaming device in the gaming system (referred to herein as the "triggering gaming device") a bonus event occurs. When the bonus event occurs, the players actively playing one or more of the other gaming devices in the gaming system (referred to herein as the "auxiliary gaming devices") are each provided a chance to participate in the bonus event as well. In one embodiment, each gaming device includes an individual pool or meter of accumulated wagers and each auxiliary gaming device's chance of participating in the bonus event is based on the individual accumulated bonus event pool for that gaming device. Accordingly, one embodiment of the gaming system and method disclosed herein guarantees that the triggering gaming device (i.e., the gaming device which triggered that bonus event) will participate in the bonus event and one, more or each auxiliary active gaming device (i.e., each gaming device which did not trigger that bonus event) is guaranteed a chance to participate in the bonus event, wherein such a chance is based on the amount of wagers previously placed at that individual gaming device. That is, the gaming system and method of implementing the gaming system disclosed herein enables a plurality of players at a plurality of gaming devices to each participate in a bonus event, regardless of which gaming device in the gaming system triggered the occurrence of the bonus event.

It should be appreciated that as each gaming device in the gaming system may be designated as either the triggering gaming device (i.e., a gaming device which causes or is otherwise directly associated with the triggering event) or an auxiliary gaming device (i.e., a gaming device which did not cause, is not associated with or is indirectly associated with the triggering event), upon the occurrences of different bonus events, the same gaming device may have different designations. That is, for a first bonus event, a first of the gaming devices in the gaming system may be designated as the triggering gaming device (and thus guaranteed to participate in the first bonus event), but for a second bonus event, the first gaming device may be designated as an auxiliary gaming device (and thus not guaranteed to participate in the second bonus event). Similarly, for a first bonus event, a second of the gaming devices in the gaming system may be designated as an auxiliary gaming device (and thus not guaranteed to participate in the first bonus event), but for a second bonus event, the second gaming device may be designated as the triggering gaming device (and thus guaranteed to participate in the second bonus event).

In one embodiment, each gaming device in the gaming system is associated with or otherwise maintains a separate gaming device accumulated bonus event pool, wherein each gaming device accumulated bonus event pool is individually funded as a percentage of the total or partial amounts wagered at that individual gaming device. In one embodiment, each gaming device includes a separate coin-in or wager meter which tracks the total or partial coin-in or wagers placed on the primary games played at that gaming device. In another embodiment, the central controller includes a separate coin-in or wager meter for each individual gaming machine which tracks the total or partial coin-in or wagers placed on the primary games for each of the gaming machines in the gaming system (i.e., the central controller maintains a gaming device accumulated bonus event pool for each gaming machine in the gaming system). In another embodiment, the central controller maintains a separate accumulated bonus event pool for each player which is tracked via a player tracking system (implemented through the use of a playing tracking card or any other suitable manner or suitable system). In this embodiment, if a player leaves a gaming machine of the gaming system, that player's wagered amounts and accumulated bonus event pool are saved for the player (via the player tracking system, the player tracking card or any other suitable system) for later use at another gaming machine. It should be appreciated that the wagers placed are tracked in any suitable compatible or comparable manner such as credits wagered (i.e., if all of the system gaming machines are of the same denomination) or monetary units (e.g., total dollars or other currency) wagered. It should be further appreciated that tracking in monetary units accounts for gaming machines having multi-denominations and/or for gaming machines of different denominations and/or gaming machines which accept different currencies.

In operation, upon a suitable triggering event at a first gaming device in the gaming system, the central controller causes a bonus event to occur. For the occurrence of this bonus event, the first gaming device is designated the triggering gaming device. The designation as the triggering gaming device ensures that gaming device success in the bonus event participation gaming sequence (as described below) and thus ensures participation in the triggered bonus event. In one embodiment, the suitable triggering event is the generation of a designated symbol or symbol combination in a primary game of the triggering gaming device. In another embodiment, the triggering of the bonus event occurs independent of any game play event which may occur in any primary game or any secondary game played at one or more gaming machines in the gaming system.

In addition to the triggering gaming device gaining entrance into the bonus event, upon the triggering of the bonus event, the central controller also determines which of the other gaming devices in the gaming system shall be provided with a chance to participate in the bonus event. In one embodiment, the central controller determines the status of the gaming devices in the gaming system and provides each gaming device which is in active status a chance to participate in the bonus event. In this embodiment, upon the triggering of a bonus event, each gaming machine is determined to be in either active status or enrolled or inactive status. Active status means that the gaming machine is being actively played by a player, wherein the active status requirements can be based on any suitable number of satisfied criteria or defined in any suitable manner by the implementer of the gaming system. For example, the current level of a gaming device's accumulated bonus event pool (i.e., is the accumulated bonus event pool at or above a designated threshold wager level) may be part of the determination of whether that gaming machine is in the active status. In another example, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); (c) the number of plays within a period of time; and (d) the existence of credits on the gaming device may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In another embodiment, each auxiliary gaming device is automatically provided a chance to participate in the bonus event. In another embodiment, a designated number of auxiliary gaming devices are each automatically provided a chance to participate in the bonus event. In another embodiment, to be provided a chance to participate in the bonus event, a gaming device's accumulated bonus event pool must equal or exceed a threshold amount. It should be appreciated that any suitable manner of determining which auxiliary gaming devices are provided a chance to participate in the bonus event may be implemented in accordance with the gaming system and method disclosed herein.

After determining which gaming devices will be provided a chance to participate in the bonus event, one, more and preferably each of such gaming devices participate in a separate or independent bonus event participation sequence or sub-game to determine which gaming devices actually will participate in the bonus event. That is, each gaming device selected to provide a chance to participate in the bonus event (along with the triggering gaming device which caused the triggering of the bonus event) initiates and displays a common bonus event participation gaming sequence or interface, such as the selection sub-game described below, wherein each player's odds of success in the bonus event participation gaming sequence is or can be varied based on one or more factors.

In one embodiment, the odds of success for one, more or each gaming device in the bonus event participation gaming sequence (i.e., and actually gaining entry to participate in the bonus event) is based on the accumulated bonus event pool of each respective gaming device. That is, the greater the accumulated wagers in a gaming device's associated accumulated bonus event pool, the greater the odds of success in the bonus event participation gaming sequence for that gaming device. It should be appreciated that since the triggering gaming device is guaranteed entry into the bonus event, the odds of success for the triggering gaming device in the bonus event participation gaming sequence is 100%. That is, regardless of anything the player of the triggering gaming device may do during the bonus event participation gaming sequence, the player of such triggering gaming device is ensured of entrance into the bonus event. In one embodiment, the player at the triggering gaming device is displayed or provided a different bonus event participation gaming sequence than the bonus event participation gaming sequence displayed to one, more or each of the auxiliary gaming devices. For example, the bonus event participation gaming sequence displayed by the triggering gaming device includes a determination of an appropriate multiplier to apply to any bonus award provided to the player of such triggering gaming device. Accordingly, the bonus event participation gaming sequence provides that a plurality of gaming devices will each have a chance to participate in the bonus event and the actual chance of participating in the bonus event can or will be varied based on the individual gaming device.

In one embodiment, each auxiliary gaming device displays a separate bonus event participation gaming sequence, however in this embodiment, zero, one or more of the auxiliary gaming devices are associated with a 0% of success in the bonus event participation gaming sequence. In another embodiment, none of the auxiliary gaming devices display the bonus event participation gaming sequence.

In one embodiment, after determining which gaming devices will be provided a chance to participate in the bonus event, each gaming device provided such a chance is displayed a plurality of selections in a bonus event participation gaming sequence. Each selection is associated with an entry into the bonus event, an entry into the bonus event with an associated modifier or a non-entry into the bonus event. In one embodiment, the odds of each selection being associated with an entry into the bonus event (with or without the associated modifier) is based on the accumulated bonus event pool of that gaming device. In this embodiment, the greater the accumulated wagers in a gaming device's associated accumulated bonus event pool, the greater the number of selections associated with entries into the bonus event (and thus the greater the chances of that gaming device participating in the bonus event). For example, if the average payout in the bonus event is one-hundred, then an active gaming device with twenty credits accumulated in its associated accumulated bonus event pool is provided a one-in-five chance of qualifying to participate in the bonus event. In this example, if the active gaming device displays ten selections to the player of such gaming device, then two selections will be associated with an entry into the bonus event (with or without the associated modifier) and eight selections will be associated with non-entries into the bonus event. It should be appreciated that since the triggering gaming device is guaranteed entry into the bonus event, each of the plurality of selections displayed by this gaming device are associated either with an entry into the bonus event or with an entry into the bonus event and an associated modifier. That is, regardless of which selection is picked at the triggering gaming device, the player of such gaming device is insured of entrance into the bonus event.

After displaying a plurality of selections at each active gaming machine, the player at each active gaming machine (including the triggering gaming device) is enabled the pick one of the displayed selections. The entry or non-entry into the bonus event associated with the picked selection is revealed. If a non-entry is revealed, then that gaming device will not participate in the bonus event. If an entry in the bonus event without an associated modifier is revealed, then that gaming device will participate in the bonus event and any bonus event award determined during the bonus event will be provided to the player. If an entry in the bonus event with an associated modifier is revealed, that gaming device will participate in the bonus event and any bonus event award determined during the bonus event will be modified by the associated modifier and such modified bonus event award will be provided to the player.

After determining which gaming devices will participate in the bonus event, the central controller will initiate the bonus event. In one embodiment, a bonus event award, such as a bonus event value, is determined for each gaming device participating in the bonus event. In one embodiment, the bonus event award determined for each gaming device participating in the bonus event is based, at least in part, on the accumulated bonus event pool for that gaming device. In another embodiment, an independent bonus event award is determined for each participating gaming device. In another embodiment, one, more or each of the bonus event awards is determined, at least in part, based on one of the bonus event awards determined at least one of the other participating gaming devices in the gaming system. In one such embodiment, the bonus event utilizes a shared device, such as a wheel, to determine one, more or each bonus event awards. It should be appreciated that any suitable manner of determining a bonus event award may be implemented.

In one embodiment, one or more players at one or more gaming devices are offered a buy-in to participate in the bonus event. In one such embodiment, the buy-in offered to the player is based on the amount in the accumulated bonus event pool associated with the player's currently played gaming device in relation to an average expected payout for the bonus event. For example, if the average expected payout for a bonus event is determined to be $10.00 and the accumulated bonus event pool associated with a player's currently played gaming device is $8.00, then a buy-in wager amount of $2.00 is offered to the player. This embodiment provides for the player to make the choice if they want to participate in the bonus event and if so, pay any difference required. In another such embodiment, even if the player's accumulated bonus event pool is greater than the average expected payout for the bonus event, the gaming system enables the player to buy-in to participate in the bonus event with an applicable bonus modifier. Such embodiments enable all players the opportunity to participate in the bonus event for each and every bonus event and also provides those players who wager more (and thus have larger accumulated bonus event pools) with a smaller buy-in than those who have wagered less.

After determining a bonus event award for each participating gaming device, any revealed modifiers are appropriately applied to any bonus event awards. That is, if a player picked selection at a gaming device revealed an associated modifier, the revealed modifier is applied to the bonus event award determined for such gaming device. Each of the bonus event awards (whether modified or not) are provided as to the respective players at such gaming devices and the bonus event ends.

In one embodiment, after the bonus event ends, the gaming device accumulated bonus event pool for each active gaming device that participated in the actual bonus event is decreased or reduced by a theoretical bonus event award regardless of the actual bonus event award provided to the player. In this embodiment, upon the triggering of the bonus event, for each active gaming device, a theoretical bonus event award is determined based on the accumulated bonus event pool of that gaming device and it is this theoretical bonus event award (and not the actual bonus event award) which is subtracted from the accumulated bonus event pool. In another embodiment, after the bonus event ends, the gaming device accumulated bonus event pool for each active gaming device that participated in the actual bonus event is reset to a designated amount, such as zero. In another embodiment, after each bonus event, the gaming device accumulated bonus event pool for each active gaming device which participated in the bonus event participation gaming sequence is reset to a designated amount, such as zero. In another embodiment, after each bonus event, the gaming device accumulated bonus event pool for one, more or each active gaming device is reset to a designated amount, such as zero. In another embodiment, after each bonus event, the gaming device accumulated bonus event pool for the triggering gaming device is reset to a designated amount, such as zero. In another embodiment, after each bonus event, the gaming device accumulated bonus event pool for the triggering gaming device is not reset.

In one alternative embodiment, based on the outcomes of a plurality of different bonus award events, a player at a gaming device in the gaming system is provided at least one award, such as a progressive award. In one such embodiment, upon a suitable triggering event, the central controller enables at least one and preferably a plurality of gaming devices in the gaming system to participate in a first bonus event. In this embodiment, for each participating gaming device, a first bonus event award or outcome is determined, wherein the determined first bonus event award or outcome is based, at least in part, on the level of that participating gaming device's accumulated bonus event pool. At least in part based on these determined first bonus event awards, the central controller selects one of the participating gaming devices to participate in a second bonus event and win a second bonus event award, such as a progressive award. Accordingly, this embodiment provides a gaming system with a group event wherein the award or outcome determined for each participating gaming device is based, at least in part, on that gaming device's level of game play prior to the group event.

In one embodiment, upon a suitable triggering event at a first gaming device, the central controller causes a first bonus event to occur, wherein the first gaming device is designated as the triggering gaming device. In one embodiment, the first bonus triggering event is the generation of a designated symbol or symbol combination in a primary game of the triggering gaming device. In another embodiment, the first bonus triggering event occurs independent of any game play event which may occur in any primary game or any secondary game played at one or more of the gaming machines in the gaming system.

In one embodiment, upon a suitable first bonus triggering event occurring, the central controller determines if the accumulated bonus event pool for the triggering gaming device is at or above a designated threshold amount, such as a designated threshold wager level. If the accumulated bonus event pool for the triggering gaming device is at or above the designated threshold wager level, the central controller enables the player at the triggering gaming device to play or participate in the first bonus event with an applicable modifier to apply to any awards or outcomes generated in the first bonus event. In this embodiment, the determination of an applicable modifier, such as a multiplier, is based on the accumulated bonus event pool of the triggering gaming device and an additional modifier component associated with being designated as the triggering gaming device. For example, the gaming system determines an applicable multiplier of 3× which is formed from the combination of an accumulated bonus event pool multiplier of 2× (based on the triggering gaming device's accumulated bonus event pool) and a triggering gaming device multiplier of 1× (which is associated with being designated as the triggering gaming device). On the other hand, if the accumulated bonus event pool for the triggering gaming device is below the designated threshold wager level, the central controller enables the player at the triggering gaming device to play or participate in the first bonus event without any applicable modifier.

In one embodiment, in addition to determining if the accumulated bonus event pool for the triggering gaming device is at or above the designated threshold wager level, for each of one or more auxiliary gaming devices, the central controller determines if the accumulated bonus event pool for that auxiliary gaming device is at or above a designated threshold wager level. If the accumulated bonus event pool for an auxiliary gaming device is below the designated threshold wager level, the central controller does not enable the player at that auxiliary gaming device to play or participate in the first bonus event. If the accumulated bonus event pool for an auxiliary gaming device is at or above the designated threshold wager level, the central controller enables the player at that auxiliary gaming device to play or participate in the first bonus event with an applicable modifier, such as a multiplier, to apply to any outcomes generated in the first bonus event. In this embodiment, the determination of an applicable modifier is based on the accumulated bonus event pool of that auxiliary gaming device. For example, for a the gaming system determines an applicable accumulated bonus event pool multiplier of 2× which is based on that auxiliary gaming device's accumulated bonus event pool.

After determining which gaming devices to participate in the first bonus event and any applicable modifiers to apply to any outcomes generated in the first bonus event, the gaming system disclosed herein enables each participating gaming device (i.e., the triggering gaming device and zero, one or more auxiliary gaming devices) to play the first bonus event. In different embodiments, the first bonus event includes one or more rounds and may be any suitable type of game including, but not limited to, slot games, card games (e.g., poker, blackjack), lottery games, skill games or perceived skill games. In the first bonus event, each participating gaming device determines a first bonus event award, wherein each participating gaming device's first bonus event award is modified by any applicable modifier associated with that gaming device to form a modified first bonus event award. In one embodiment, each participating gaming device provides its respective modified first bonus event award to the player of that gaming device. It should be appreciated that for any participating gaming devices without an applicable modifier, a modifier of 1× is utilized to form a modified first bonus event award.

In one embodiment, the central controller selects one of the participating gaming devices to play or participate in a second bonus event. In one such embodiment, the central controller selects one of the participating gaming devices based, at least in part, on that gaming device's modified first bonus event award. In one example embodiment, the central controller determines the participating gaming device with the highest or greatest modified first bonus event award and enables that gaming device to play or participate in at least one second bonus event. In this embodiment, the gaming device's outcome in the second bonus event determines an award to provide to the player of the determined gaming device with the highest modified first bonus event award. In different embodiments, the second bonus event includes one or more rounds and may be any suitable type of game including, but not limited to, slot games, card games (e.g., poker, blackjack), lottery games, skill games or perceived skill games.

In one such embodiment, the gaming device's outcome in the second bonus event determines which of the plurality of progressive awards in an MLP configuration to provide. In this embodiment, the gaming system maintains a plurality of progressive awards in a multi-level progressive or MLP configuration and the outcome(s) of the second bonus event determine which level of the MLP (and which associated progressive award) to provide to the player of the participating gaming device with the highest modified first bonus event award. Accordingly, it should be appreciated that this embodiment enables a number of players to participate in a first bonus event, wherein one of those players is enabled to further participate in a second bonus event to win one of a plurality of progressive awards of a multi-level progressive award configuration.

In another embodiment, when one player at one gaming device triggers a first bonus event or first bonus game, the central controller enables all the players at all the gaming devices in the gaming system to participate in the first bonus event or first bonus game. In this embodiment, for each participating gaming device, the play of the first bonus game is dependent on the accumulated bonus event pool for that gaming device. In one such embodiment, the accumulated bonus event pool associated with a specific participating gaming device determines the number of reel spins (or wheel spins) and any applicable modifier in the first bonus game for that specific gaming device. In these embodiments, each participating gaming device plays its respective first bonus game to determine a first bonus game outcome.

In one embodiment, the first bonus game outcome determined for a specific gaming device is funded, at least in part, by the accumulated bonus event pool associated with that gaming device. In one such embodiment, any remainder in an accumulated bonus event pool associated with a participating gaming device which is not provided as the first bonus game outcome is applied to or otherwise rolls over into the gaming device's accumulated bonus event pool for a subsequently triggered bonus event or bonus game. In another embodiment, any remainder in an accumulated bonus event pool associated with a participating gaming device which is not provided as the first bonus game outcome is forfeited (and the gaming device's accumulated bonus event pool is reset to a designated amount, such as zero).

In one embodiment, the central controller compares the results from the first bonus game for each gaming device to determine a winning gaming device of the first bonus game. In this embodiment, the central controller enables the winning gaming device to participate in a second bonus event or second bonus game. The winning gaming device plays or participates in the second bonus game, wherein the play of the second bonus game determines which progressive award of an MLP configuration is provided to the player of the winning gaming device of the first bonus game. Accordingly, it should be appreciated that this embodiment enables a number of players to participate in a first bonus game, wherein one of those players is enabled to further participate in a second bonus game to win one of a plurality of progressive awards of a multi-level progressive award configuration.

In another alternative embodiment, a secondary event is initiated upon a suitable secondary event triggering condition. In this embodiment, the triggered secondary event results in a secondary event award. The amount or value of the secondary event award is determined based on the wager placed at the triggering gaming device. In one embodiment, a portion or percentage of the secondary event award is provided to the triggering gaming device and the remaining portion or percentage of the secondary event award is distributed across one or more of the auxiliary gaming devices in the gaming system. In one such embodiment, the portion of the secondary event award provided to each auxiliary gaming device is based on that gaming device's accumulated bonus event pool. That is, the greater the accumulated bonus event pool associated with an auxiliary gaming device, the greater portion of the secondary event award provided to that auxiliary gaming device. In one embodiment, part or all of the remaining portion of the secondary event award is redistributed to the triggering gaming device. In one such embodiment, the portion or percent of the remaining portion of the secondary event award that is redistributed to the triggering gaming device is based on the accumulated bonus event pool of the triggering gaming device.

In one embodiment, upon a suitable secondary event triggering condition at a first gaming device, the central controller causes a secondary event to occur, wherein the first gaming device is designated as the triggering gaming device. In one embodiment, the secondary event triggering condition is the generation of a designated symbol or symbol combination in a primary game of the triggering gaming device. In another embodiment, the secondary event triggering condition occurs independent of any game play event which may occur in any primary game or any secondary game played at one or more of the gaming machines in the gaming system. In one such embodiment, the secondary event triggering condition which occurs independent of any game play event is triggered independent of any wager amounts placed. That is, in this embodiment, the odds of the secondary event triggering condition occurring in association with a play of a gaming device are the same regardless of the amount of the wager placed.

In one embodiment, upon a suitable second event triggering condition occurring, the gaming system disclosed herein enables the players at one or more of the gaming devices to participate in a secondary event. The secondary event may be any suitable game or sequence which results in a secondary event award. In one embodiment, the secondary event is a number of games or sequences or a multiples of the same game or sequence. In different embodiments, the secondary event includes one or more rounds and may be any suitable type of game including, but not limited to, slot games, card games (e.g., poker, blackjack), lottery games, skill games or perceived skill games.

In one embodiment, the secondary event award is based, at least in part, on the wager amount placed at the triggering gaming device. That is, any secondary event award provided to any players at any gaming device in the gaming system is directly proportional to the bet multiple of the triggering gaming device. For example, if a player wagered a first amount of 5 credits at the triggering gaming device, the secondary event award is based, at least in part, on the first wager amount of 5 credits. In another example, if the player wagered a second amount of 10 credits at the triggering gaming device, the secondary event award is based, at least in part, on the second wager amount of 10 credits. As the amount of the secondary event award is based on the wager amount placed at the triggering gaming device and as the secondary event award is distributed over a plurality of gaming devices in the gaming system (as described in more detail below), the gaming system disclosed herein provides increased excitement and enjoyment for players because at one or more auxiliary gaming devices, the player's secondary event awards are based on one or more variables outside that player's control. That is, determining a group secondary event award based on one or more variables at one gaming device in the gaming system, such as based on a bet multiple at a different gaming device other than the gaming device the player is currently playing, provides increased excitement and enjoyment for players at the gaming devices in the gaming system disclosed herein.

In one embodiment, after a secondary event award is determined, a portion of the determined secondary event award is provided to the triggering gaming device. In one such embodiment, the player at the triggering gaming device is provided a set or predetermined percentage of the determined secondary event award. In another such embodiment, the portion of the determined secondary event award provided to the triggering gaming device is based on the accumulated bonus event pool associated with the triggering gaming device.

In one embodiment, in addition to distributing part of the determined secondary event award to the triggering gaming device, part or all of the remaining portion of the determined secondary event award is distributed across one or more of the auxiliary gaming devices in the gaming system. In one such embodiment, the portion or percentage of the secondary event award provided to each auxiliary gaming device is based on that gaming device's accumulated bonus event pool. In this embodiment, the greater the accumulated bonus event pool associated with an auxiliary gaming device, the greater portion of the secondary event award provided to that auxiliary gaming device. In another embodiment, the portion of the secondary event award provided to each auxiliary gaming device is based on that gaming device's accumulated bonus event pool relative to a designated amount of accumulated wagers in the gaming system when the secondary event is triggered. In this embodiment, the central server (or one or more individual gaming device processors) determines, for each auxiliary gaming device, a portion or percentage of the secondary event award to provide to the player of that auxiliary gaming device based on that gaming device's accumulated bonus event pool relative to the total amounts wagered on each of the gaming devices in the gaming system (i.e., a total accumulated bonus event pool for each of the gaming devices in the gaming system) during a designated time period.

In one embodiment, part or all of the remaining portion or percentage of the secondary event award may be redistributed and provided to the triggering gaming device. In one such embodiment, the central server determines whether part or all of the remaining portion of the secondary event award is redistributed to the triggering gaming device based on the accumulated bonus event pool associated with the triggering gaming device. In another such embodiment, the central server determines, based on the accumulated bonus event pool associated with the triggering gaming device relative to the accumulated bonus event pool associated with one or more of the auxiliary gaming devices, whether part or all of the remaining portion of the secondary event award is redistributed to the triggering gaming device. In another such embodiment, the central server determines whether part or all of the remaining portion of the secondary event award is redistributed to the triggering gaming device based on the accumulated bonus event pool of the triggering gaming device exceeding a threshold level. In this embodiment, the amount of any of the remaining portion of the secondary event award which is redistributed to the triggering gaming device is based on the amount, if any, by which the accumulated bonus event pool of the triggering gaming device exceeds the threshold level.

Accordingly, one embodiment of the gaming system disclosed herein determines a group secondary event award based on the wager placed at one of the gaming devices in the gaming system. Moreover, the gaming system disclosed herein provides a first portion of the secondary event award to the triggering gaming device, provides a second portion of the secondary event award to one or more auxiliary gaming devices and provides a further third portion, if any, of the secondary event award to the triggering gaming device.

The gaming system disclosed herein contemplates employing one or more displays in conjunction with the gaming machines which will provide the players of the gaming machines information about the bonus awards to increase player awareness of these awards and interaction between players of the gaming machines. The display(s) can provide any suitable information about the gaming system, gaming machines, bonus events and bonus event awards.

Accordingly, the gaming system and method disclosed herein provides a multi-player gaming environment wherein the success of one player benefits one, more or all active players in the same group. In other words, the player at the gaming device that caused the triggering of the bonus event is guaranteed entry into the bonus event, while the players at the other active gaming devices are provided a chance game to qualify to participate in the bonus event, wherein the odds of qualifying are based on the accumulated bonus event pool associated with that gaming device. This creates an atmosphere of support among players as well as providing players with the appearance of multiple bonus events. That is, players at the gaming devices of the disclosed gaming system should not feel they are competing with one or more other players for part or all of the bonus event awards. It should be appreciated that while the players will each be given the chance at these multiple bonus events, the payouts in these bonus events may still be controlled and funded from the wagers placed at the individual gaming machine. This provides control to the game designer in allowing for a game that has a high rate of bonuses and a high volatility while being funded by each individual gaming machine.

Accordingly, an advantage of the gaming system disclosed herein is to provide a gaming system having a plurality of gaming devices wherein multiple bonus event awards can be provided simultaneously or substantially simultaneously to players based on a single occurrence of a bonus triggering event.

Another advantage is to provide a gaming system having a plurality of gaming devices which each employ a gaming device accumulated bonus event pool which determine, at least in part, the odds of each active gaming device qualifying to participate in the bonus event.

Additional features and advantages are described in, and will be apparent from, the following Detailed Description and the figures.

BRIEF DESCRIPTION OF THE FIGURES

FIG. 9 is a chart of an example of the relative wagered amounts for three auxiliary gaming devices and the percentage of the remaining portion of the secondary event award associated with each of the gaming devices.

FIG. 10 is a chart of an example of the relative wagered amounts for three auxiliary gaming devices and the triggering gaming device and the percentage of the remaining portion of the secondary event award associated with each of the gaming devices.

DETAILED DESCRIPTION

In one embodiment, the gaming system disclosed herein includes a plurality of bonus event awards provided to players of the linked gaming machines in an apparently random fashion to the players of these gaming machines. These awards are referred to herein as bonus event awards to distinguish them from the awards that the gaming machines provide to the players for winning outcomes in the plays of the primary wagering games, such as slot games, card games (e.g., poker, blackjack) or any other suitable game.

In one embodiment, the gaming devices of the gaming system are operable to provide multiple bonus event awards to multiple players at the multiple linked gaming devices at the same time or substantially the same time. Alternatively, the gaming devices of the gaming system are operable to provide multiple bonus event awards to multiple players at the multiple linked gaming devices in an overlapping or sequential manner.

Figure 1:
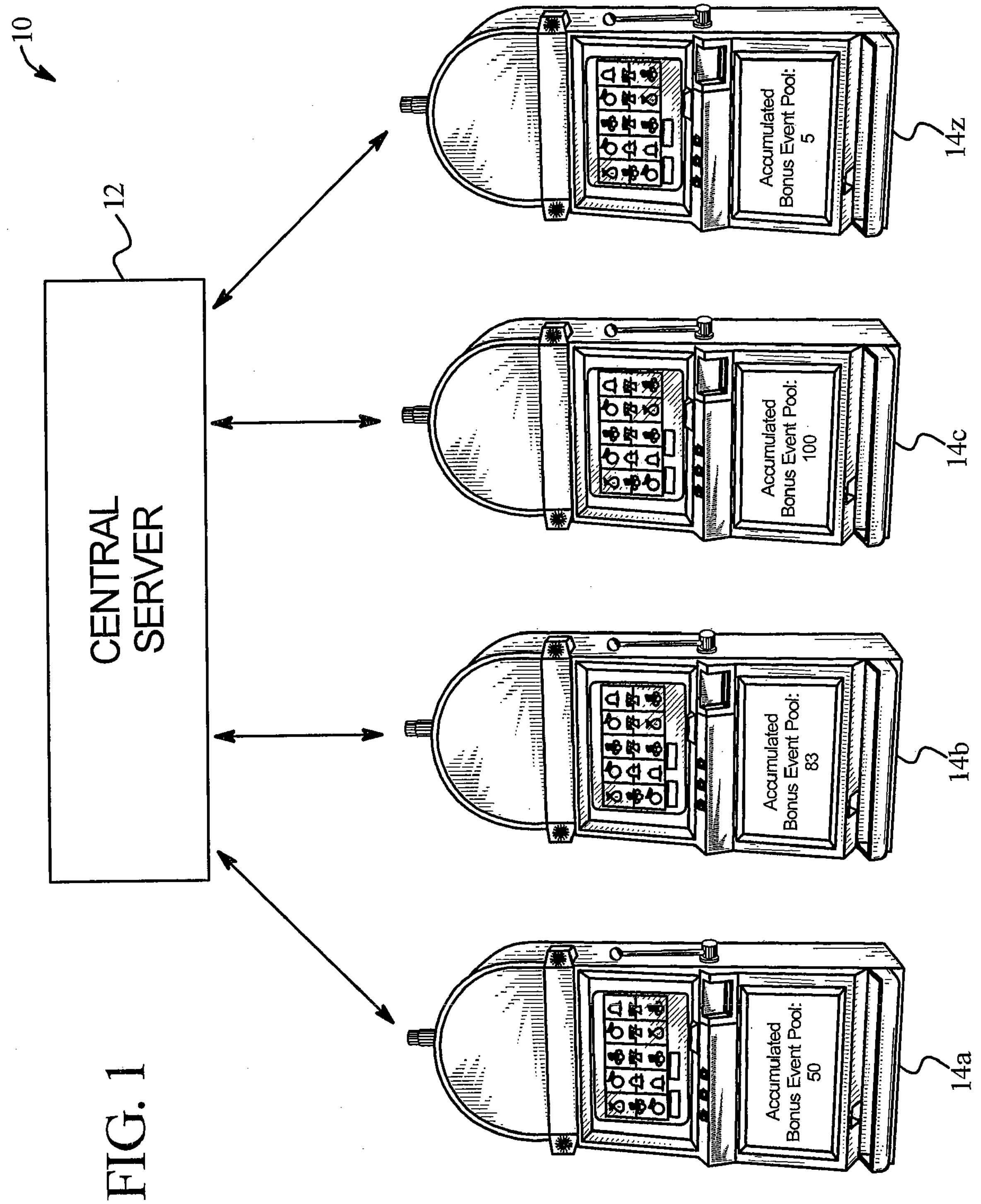
FIG. 1 is a schematic diagram of the central server in communication with a plurality of gaming machines in accordance with one embodiment of the gaming system disclosed herein.

Referring to FIG. 1, one embodiment of the gaming system 10 includes a central server, central controller or remote host 12 and a plurality of gaming machines or gaming devices 14*a*, 14*b*, 14*c* . . . 14*z* in communication with or linked to the central server or central server 12 through a data network or a remote communication link. The linked gaming machines may be of the same type or of different types of gaming machines. The linked gaming machines may have the same primary game or two or more different primary games.

The number of gaming machines in the gaming system can vary as desired by the implementer of the gaming system. These gaming machines are referred to herein alternatively as the group of gaming machines, the linked gaming machines or the system gaming machines. The play of each of the gaming machines in the group is monitored by the central server 12. That is, the central server or controller maintains or keeps track of the play and/or other activity on or relating to the gaming machines in the gaming system. In one embodiment, the central server keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. It should be appreciated that the player of a gaming machine may change during this tracking and that this tracking can be independent of the specific player playing the gaming machine. In one embodiment, as described below, the central server determines the status of each of the gaming machines in the group based on this information. It should be further appreciated that other information may be employed by the central server or controller to determine the status of each of the gaming machines in the group. For instance, the number of games played or the amount of each wager placed on each play may be used in the determination of the status of each gaming machine. The central server, central controller or remote host may be any suitable server or computing device which includes at least one processor and at least one memory or storage device. In alternative embodiments, the central server is a progressive controller or another gaming machine in the gaming system. The terms central server, central controller and remote host are used interchangeably herein.

Figure 2A:
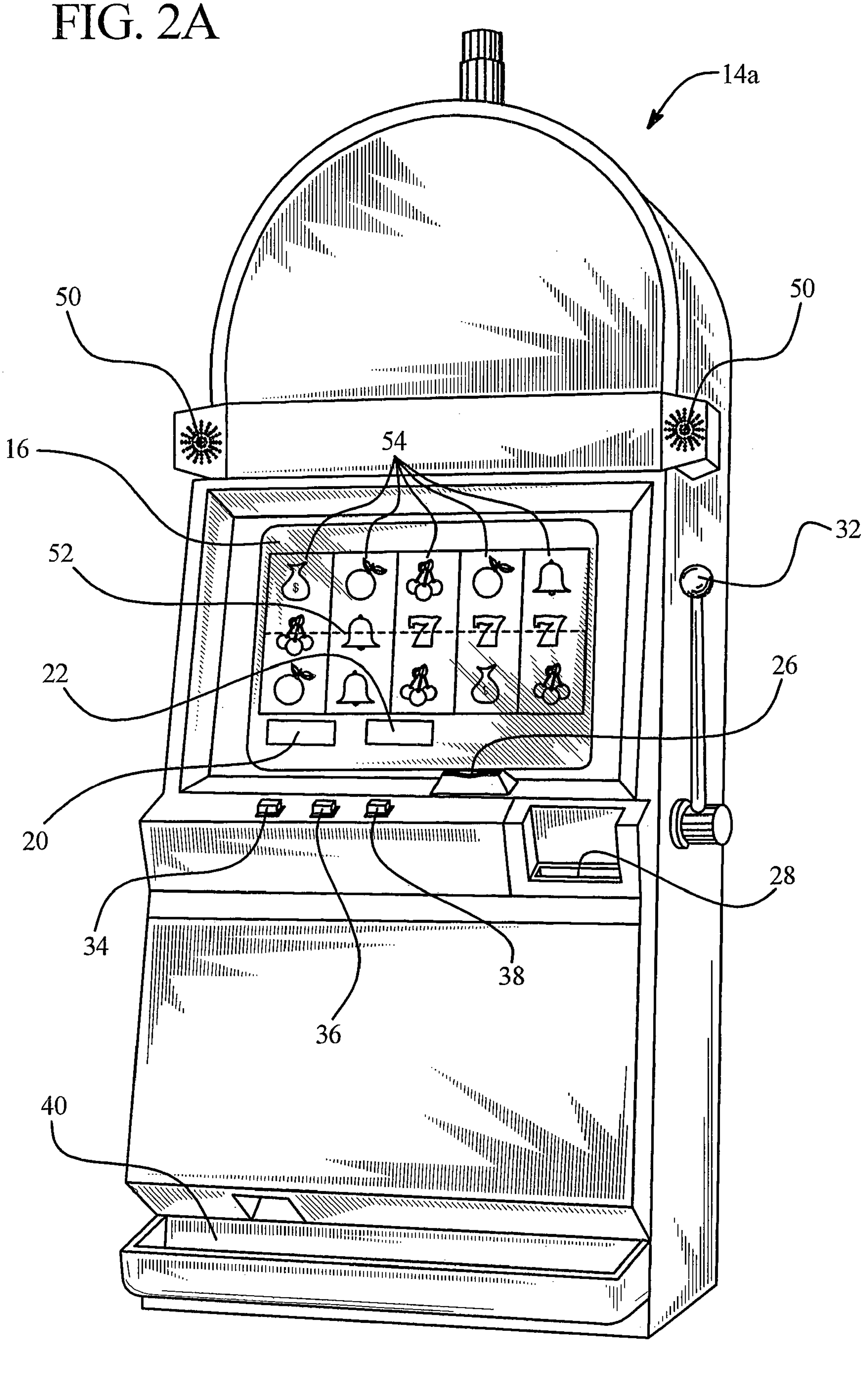
FIGS. 2A and 2B are front perspective views of alternative embodiments of gaming devices disclosed herein.
Figure 2B:
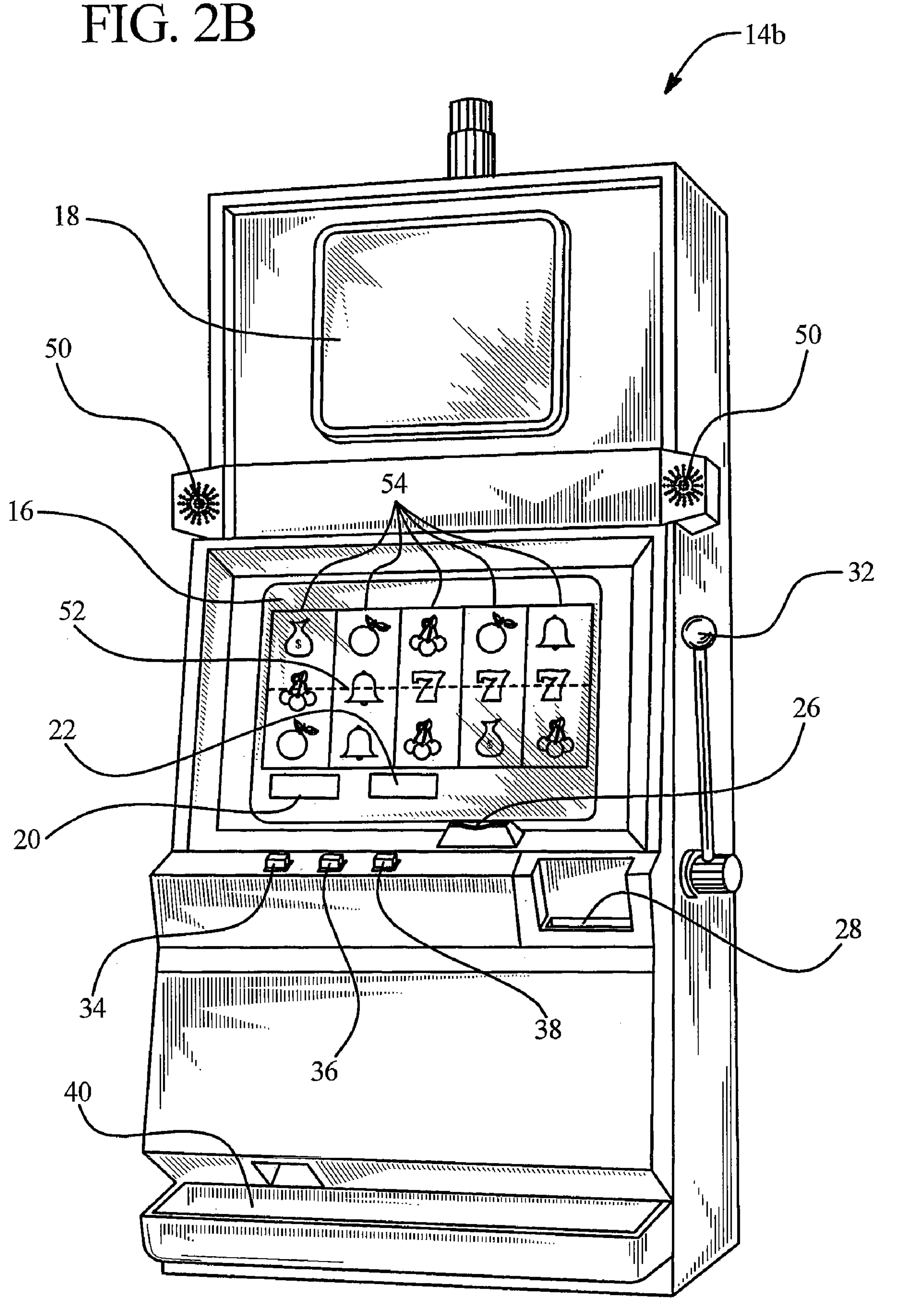

Two alternative embodiments of the gaming devices of the gaming system are illustrated in FIGS. 2A and 2B as gaming device 14*a* and gaming device 14*b*, respectively. Gaming device 14*a* and/or gaming device 14*b* are generally referred to herein as gaming device 14.

In one embodiment, as illustrated in FIGS. 2A and 2B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

Figure 3:
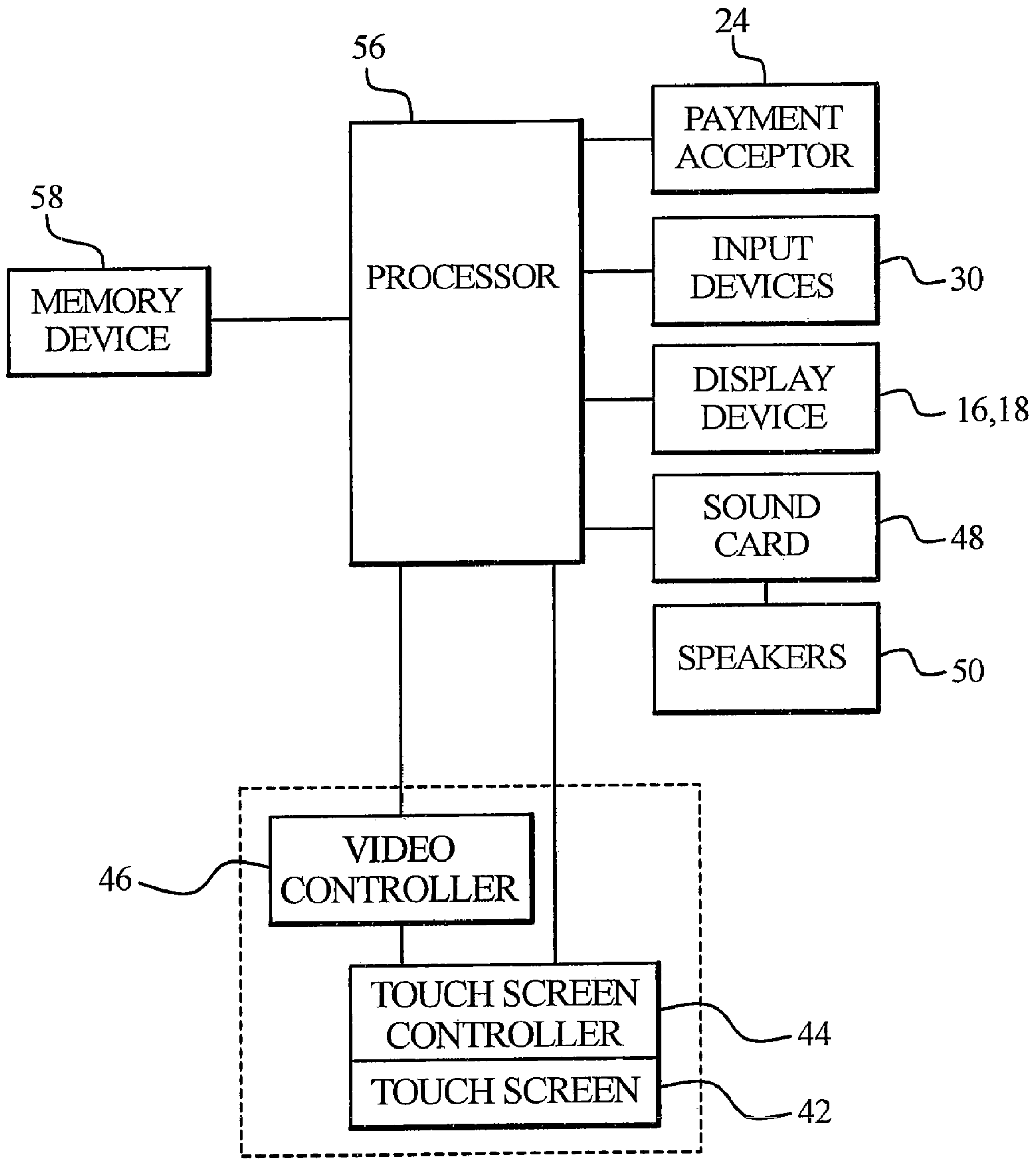
FIG. 3 is a schematic block diagram of the electronic configuration of one embodiment of a gaming device disclosed herein.

In one embodiment, as illustrated in FIG. 3, the gaming device preferably includes at least one processor 56, such as a microprocessor, a microcontroller-based platform, a suitable integrated circuit or one or more application-specific integrated circuits (ASIC's). The processor is in communication with or operable to access or to exchange signals with at least one data storage or memory device 58. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 3, the gaming device includes one or more display devices controlled by the processor. The display devices are preferably connected to or mounted to the cabinet of the gaming device. The embodiment shown in FIG. 2A includes a central display device 16 which displays a primary game. This display device may also display any suitable secondary game associated with the primary game as well as information relating to the primary or secondary game. The alternative embodiment shown in FIG. 2B includes a central display device 16 and an upper display device 18. The upper display device may display the primary game, any suitable secondary game associated or not associated with the primary game and/or information relating to the primary or secondary game These display devices may also serve as digital glass operable to advertise games or other aspects of the gaming establishment. As seen in FIGS. 2A and 2B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 3, in one embodiment, the gaming device includes at least one payment acceptor 24 in communication with the processor. As seen in FIGS. 2A and 2B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 3, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 3, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 14 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 2A and 2B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device, such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 2A and 2B. In other embodiments, the triggering event or qualifying condition may be by exceeding a certain amount of game play (such as a number of games, number of credits, amount of time) or reaching a specified number of points earned during game play.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, the game outcome provided to the player is determined by the central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming devices of the gaming system disclosed herein are associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

In one such embodiment, the present disclosure is employed in a server based gaming system. In this embodiment, as described above, one or more gaming devices are in communication with a central server or controller, wherein the central server or controller may be any suitable server or computing device which includes at least one processor and a memory or storage device. In alternative embodiments, the central server is a progressive controller or another gaming machine in the gaming system. In one embodiment, the memory device of the central controller stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Gaming Device Accumulated Bonus Event Pools

In one embodiment, each gaming device in the gaming system is associated with or otherwise maintains a separate gaming device accumulated bonus event pool. In this embodiment, each gaming device accumulated bonus event pool is individually funded as a percentage of the amounts wagered at that individual gaming device. That is, each gaming device accumulated bonus event pool starts at a designated level, such as $0 and increases or accumulates based on a small percentage (such as 0.1%) of coin-in or wagered amounts at that gaming device. For example, as illustrated in FIG. 1, a first gaming device 14*a* is associated with a first gaming device accumulated bonus event pool with 50 accumulated wagered monetary units, a second gaming device 14*b* is associated with a second gaming device accumulated bonus event pool with 83 accumulated wagered monetary units, a third gaming device 14*c* is associated with a third gaming device accumulated bonus event pool with 100 accumulated wagered monetary units and another gaming device 14*z* is associated with another gaming device accumulated bonus event pool with 5 accumulated wagered monetary units.

In one embodiment, each gaming device includes a separate coin-in or wager meter which tracks the total or partial coin-in or wagers placed on the primary games played at that gaming device. In another embodiment, the central controller includes a separate coin-in or wager meter for each individual gaming machine which tracks the total or partial coin-in or wagers placed on the primary games for each of the gaming machines in the gaming system (i.e., the central controller maintains a gaming device accumulated bonus event pool for each gaming machine in the gaming system). In one embodiment, as described below, since the amounts allocated to the accumulated bonus event pools will theoretically be returned to the players of such gaming devices, the percentage of wagers placed allocated to the accumulated bonus event pools is determined by subtracting the desired hold percentage for a gaming device from the configured hold percentage for that gaming device. For example, if a gaming device is configured to hold 10%, on average, of wagers placed (i.e., the gaming device pays back 90%, on average, of wagers placed) but the gaming system operator determines that they want to only hold 5%, on average, of wagers placed (i.e., the gaming system operator desires the gaming devices to pay back 95%, on average, of wagers placed), 5% of the wagers placed at each gaming device are allocated to that gaming device's accumulated bonus event pool. It should be appreciated that the wagers placed are tracked in any suitable compatible or comparable manner such as credits wagered (i.e., if all of the system gaming machines are of the same denomination) or monetary units (e.g., total dollars or other currency) wagered. It should be appreciated that tracking in monetary units accounts for gaming machines having multi-denominations and/or for gaming machines of different denominations and/or gaming machines which accept different currencies.

In one embodiment, the relative amount of the wager meters for the gaming machines vary based on other factors such as the desire to reward a player who has a higher gaming status than other players. For instance, if a player has a higher level status or player tracking card, the player may be provided more monetary units in the gaming device accumulated bonus event pool of the gaming device which the player is playing. Thus, in one embodiment, the gaming device accumulated bonus event pool for a gaming machine may be set or reset to a seed amount or to include a seed amount based on the status of the player or one or more other factors. In another embodiment, different players of different player statuses have different portions of their placed wagers contributed to their respective gaming device's accumulated bonus event pool. For example, a bronze level player may have 5% of their placed wagers allocated to the bronze level player's gaming device's accumulated bonus event pool and a gold level player may have 7% of their placed wagers allocated to the gold level player's gaming device's accumulated bonus event pool. Alternatively, credits or monetary units may be added to the players total wagered amounts to give a player an advantage.

In another embodiment, the central controller maintains a separate accumulated bonus event pool for each player which is tracked via a player tracking system (implemented through the use of a playing tracking card or any other suitable manner). That is, the wagers are accumulated based on individual players instead of gaming machines. In this embodiment, the gaming system is configured to track each player's total or partial wagers and base that player's odds of success in the bonus event participation gaming sequence, as described below, on the player's individual accumulated bonus event pools. In this embodiment, if a player leaves the gaming machine of the gaming system, that player's wagered amounts are saved for the player for later use at another gaming machine. In one embodiment, if the player leaves a gaming machine of the gaming system, the player's wagers are retained through the playing tracking system or the player tracking card until a designated time or event. In another embodiment, if the player leaves a gaming machine of the gaming system without transferring the wagers allocated to their personal individual accumulated bonus event pool using the player tracking system (e.g., the player is not registered in the player tracking system or the player does not have a playing tracking card), the gaming system sets certain criteria which must be fulfilled to reset their individual accumulated bonus event pool.

Determination of Bonus Events

Figure 4:
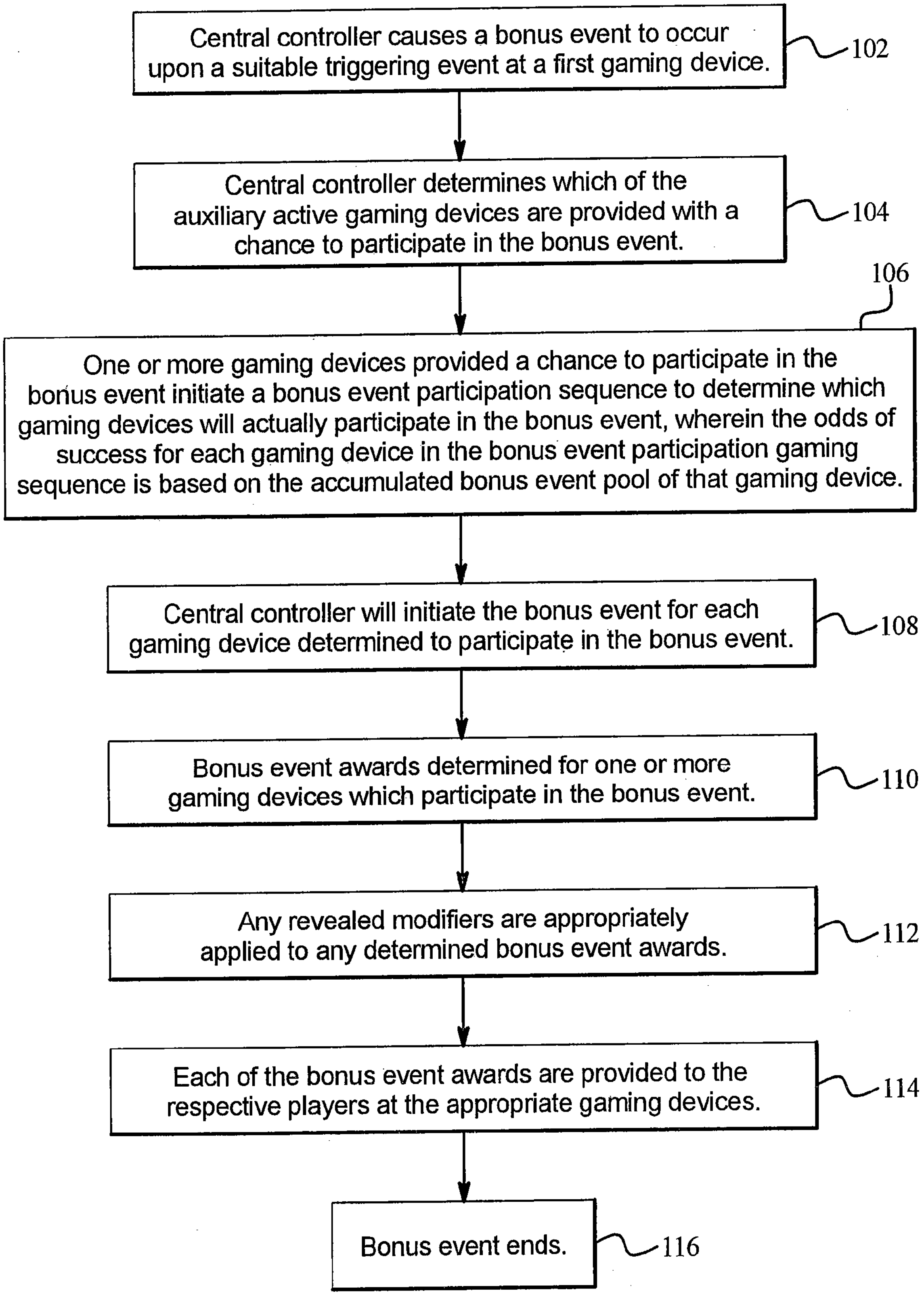
FIG. 4 is a flowchart of one embodiment of the gaming system disclosed herein illustrating the triggering of a bonus event to the providing of one or more bonus event awards.

In one embodiment, upon a suitable triggering event at a first gaming device 14*a* in the gaming system (i.e., the gaming device designated as the triggering gaming device for this bonus event), the central controller causes a bonus event to occur as indicated in block 102 of FIG. 4. As described below, by causing the bonus event to occur, the triggering gaming device is guaranteed entrance into the subsequently occurring bonus event.

In one embodiment, the triggering of the bonus event occurs through a game play event, such as the generation of a designated symbol or symbol combination or any other suitable symbol-driven trigger, at an individual gaming machine in the gaming system. In another embodiment, the triggering of the bonus event occurs independent of any game play event which may occur in any primary game or any secondary game played at one or more gaming machines in the gaming system.

In one such embodiment, the triggering of the bonus occurs based on at least one accumulated value pool incrementing to a hit value. In one such embodiment, the gaming system includes one or more accumulated value progressive awards or $N^{th}$ coin progressive awards. Such accumulated value progressive awards are driven by an amount of wagers placed or a suitable coin-in amount. In one such embodiment, each accumulated value progressive award is associated with a range of values, wherein each progressive award will be provided to a player of a gaming device in the gaming system when the progressive award increments to a progressive award hit value within the range of values associated with that progressive award. That is, when an accumulated value progressive award increases to a determined progressive award hit value, a triggering of the first bonus event will occur. In different embodiments, the progressive award hit value at which an accumulated value progressive award causes a triggering of the bonus event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a triggering of the bonus event to occur, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a triggering of the bonus event to occur when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award a player plays for is based on a player's status (via a player tracking system). For example, a bronze level player may play for an accumulated value progressive award associated with a value range of $10 to $100, a silver player may play for an accumulated value progressive award associated with a value range of $200 to $500 and a gold player may play for an accumulated value progressive award associated with a value range of $1000 to $5000.

In another embodiment, the triggering of the bonus event is based on time. In this embodiment, a time is set for when a triggering event will occur. In one embodiment, such a set time is based on historic data. For example, if previous bonus event triggers have occurred after approximately sixty-seven hours, a bonus event may be set to trigger sixty-seven hours from the conclusion of the previous bonus event. In one embodiment, a suitable algorithm is implemented to determine the player who wagered at or closest to this time with tie-breaking based on any number of factors (e.g., player tracking history, amount of or recent wagers placed). In this embodiment, the gaming device which the algorithm determined wagered closest to when the bonus event triggered is designated the triggering gaming device. In another embodiment, one of the gaming devices which placed a wager during a designated time period is randomly selected and designated as the triggering gaming device.

In another such embodiment, the triggering of the bonus event is based on a predefined variable reaching a defined parameter threshold. For example, the bonus event is triggered when the $500^{th}$ different player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for the progressive.

In another embodiment, the triggering of the bonus event occurs after a random number of plays in which a progressive award is not provided to a player. In another embodiment, the triggering of the bonus event is based upon gaming system operator defined player eligibility parameters stored on a player tracking system (such as via a player tracking card or other suitable manner). In another embodiment, the triggering of the bonus event is based upon gaming system operator defined player eligibility parameters stored on a player tracking system (such as via a player tracking card or other suitable manner).

In another such embodiment, the triggering of the bonus event includes a system determination which is based on a random selection by the central controller. In this embodiment, the central controller tracks all active gaming machines and the wagers they placed (via an accumulated wager pool). When the accumulated wager pool at least exceeds a predefined threshold, the central controller randomly determines (at predetermined intervals) if a bonus event will occur. In one embodiment, the player who consistently places a higher wager is more likely to receive cause a bonus event to be triggered than a player who consistently places a minimum wager.

In another such embodiment, the central controller determines, in cooperation with the gaming device, when to trigger a bonus event by utilizing one or more random number generators. In this embodiment, the central controller determines when to trigger a bonus event by determining if any numbers allotted to a gaming device match a randomly selected number. In one such embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine triggers a bonus event. It should be appreciated that any suitable manner of triggering the bonus event may be implemented with the gaming system disclosed herein.

In one embodiment, upon the triggering of the bonus event, the central controller also determines which of the gaming devices in the gaming system shall also be provided with a chance to participate in the bonus event as indicted in block 104. In one embodiment, the central controller determines the status of the gaming devices in the gaming system and provides zero, one or more gaming devices which are in active status a chance to participate in the bonus event. In this embodiment such determination is based, at least in part, on the status of each of the gaming devices in the gaming system. In one embodiment, the status of one or more gaming machines in the gaming system as either enrolled or inactive status or active status determines whether those gaming machines are eligible to participate in the bonus event. In one embodiment, the status of one or more gaming machines in the gaming system when the bonus event is triggered also determines the number of bonus event awards provided in the bonus event. For example, the central controller determines that, based on one or more criteria as described below, auxiliary gaming machine 14*b* is in active status (and thus provided a chance to participate in the bonus event), auxiliary gaming machine 14*c* is in active status (and thus provided a chance to participate in the bonus event) and auxiliary gaming machine 14*z* is in inactive status.

The enrolled or inactive status means that the gaming machine is one of the linked gaming machines in the system, but is not being actively played by a player during a bonus event qualification period. A gaming machine may be classified as enrolled status for several reasons. For example, no player may be playing the gaming machine. In another example, a player could be playing the gaming machine (i.e., by having credits on the gaming machine), but be playing too slowly or be interrupted during play. In this case, the player could have credits on the credit meter of the gaming machine, but the player has not made a wager on a primary game or otherwise qualified for a bonus event during the bonus event qualification period.

The active status means that the gaming machine is being actively played by a player during a bonus event qualification period. In one embodiment, actively playing during a bonus event qualification period means that the player is playing the primary game of the gaming machine (i.e., placing wagers on plays of the primary game) at least at a predefined minimum rate during a predefined time period. For example, the gaming machine may be in active status when a player has made at least one play of the primary game in a fifteen second period prior to the triggering of the bonus event. In this example, the bonus event qualification period is that fifteen second period prior to the triggering of the bonus event.

In another embodiment, the active status is alternatively or additionally based on the amount wagered on the plays of the primary game during a bonus event qualification period. In a further alternative embodiment, the determination of the active status is based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming machines. In another embodiment, a gaming machine can only be determined to be an active gaming machine if an additional wager, such as a side-bet or side-wager, is made by a player at a gaming machine of the gaming system for one player of a game, a plurality of plays of a game or all plays of a game in a designed period of time, such as a designed time period. It should be appreciated that a gaming machine is classified as active based on any one or more suitable parameters or criteria as determined by the implementer or operator of the gaming system.

Additionally, it should be appreciated that the gaming system disclosed herein contemplates other or additional methods for determining that a gaming machine is active. For instance, the player may be enabled to make a side wager or additional wager to be active for one or more subsequent bonus events. The side wager feature could also be time based where the additional wager causes the gaming machine to be active for a subsequent time period, such as one minute. In another alternative embodiment, a minimum wager level is required for a gaming machine to qualify to participate in the bonus event. In one embodiment, this minimum wager level is the maximum wager level for the primary game in the gaming machine. This requirement is in addition to the requirement that the gaming machine be active to qualify to participate in the bonus event participation gaming sequence. Another method for determining if the gaming machine is active is whether or not the player has wagered a minimum level of monetary units since the occurrence of the last bonus event.

It should also be appreciated that one or more additional statuses may be employed. For instance, a gaming machine will be in a participating status if an individual player playing the gaming machine is a premier player. This could be determined at least in part based on the status of that player determined via a player tracking card or other player identification device used by that player in the gaming machine. It should be appreciated that other criteria can be used to determine if a player is in the participating status. It should be further appreciated that when a gaming machine is in the participating status, the gaming system automatically treats the gaming machine as an active gaming machine for purposes of the other determinations including bonus event eligibility by the gaming system.

In one embodiment, the triggering gaming device participates in the bonus event regardless of the status of such gaming device. In another embodiment, the triggering gaming device must be in a current state of active status to participate in the bonus event. In another embodiment, the gaming system requires that a designated number of auxiliary gaming devices are in active status. In another embodiment, each auxiliary gaming device is automatically provided a chance to participate in the bonus event. In another embodiment, a designated number of auxiliary gaming devices are each automatically provided a chance to participate in the bonus event. It should be appreciated that any suitable manner of determining which auxiliary gaming devices are provided a chance to participate in the bonus event may be implemented.

After determining which gaming devices will be provided a chance to participate in the bonus event, one, more and preferably each of such gaming devices participate in or initiate a separate bonus event participation sequence or subgame to determine which gaming devices will actually participate in the bonus event as indicated by block 106 of FIG. 4. In this embodiment, one or more gaming devices selected to provide a chance to participate in the bonus event (along with the triggering gaming device) initiate or display a common bonus event participation gaming sequence or interface, such as the selection sub-game described below. In another embodiment, a plurality of the gaming devices selected to provide a chance to participate in the bonus event (with or without the triggering gaming device) each initiate or display a different bonus event participation gaming sequence or interface. In one embodiment, each player's odds of success in the bonus event participation gaming sequence is varied based on one or more suitable factors. It should be appreciated that since the triggering gaming device is guaranteed entry into the bonus event, the odds of success for this triggering gaming device in the bonus event participation gaming sequence is 100%. That is, regardless of anything the player of the triggering gaming device may do during the bonus event participation gaming sequence, the player of such triggering gaming device is insured of entrance into the bonus event.

In one embodiment, the odds of success for one or more gaming devices in the bonus event participation gaming sequence (i.e., and thus the odds of actually gaining entry to participate in the bonus event) are based on the accumulated bonus event pool of that gaming device. That is, the greater the accumulated wagers in a gaming device's associated accumulated bonus event pool, the greater the odds of success in the bonus event participation gaming sequence for that gaming device. For example, if the odds of participating in the bonus event is associated with a gaming device's maintained accumulated bonus event pool relative to a set or designated amount of accumulated wagers, such as two-hundred, when the bonus event is triggered and active auxiliary gaming device 14*c* maintains an accumulated bonus event pool of one-hundred, active auxiliary gaming device 14*c* will be associated with a 50% chance of success (100/200) in the bonus event participation gaming sequence. Such a configuration enables players who wager higher amounts to have higher probabilities of participating in the bonus event, while also enabling players who wager lower amounts to have a reasonable relative chance of participating in the bonus event.

In one embodiment, a plurality of gaming devices have different odds of success in the bonus event participation gaming sequence. In another embodiment, each of the gaming device have different odds of success in the bonus event participation gaming sequence. In another embodiment, a plurality of the gaming devices have the same odds of success in the bonus event participation gaming sequence. In another embodiment, each of the gaming devices have the same odds of success in the bonus event participation gaming sequence. In different embodiments, the odds of success for one or more gaming devices in the bonus event participation gaming sequence are predetermined, randomly determined, determined based on the player's wager, determined based on the player's status (such as determined through a player tracking system), determined based on a level of a jackpot award, determined based on time or determined based on any other suitable method.

Figure 5A:
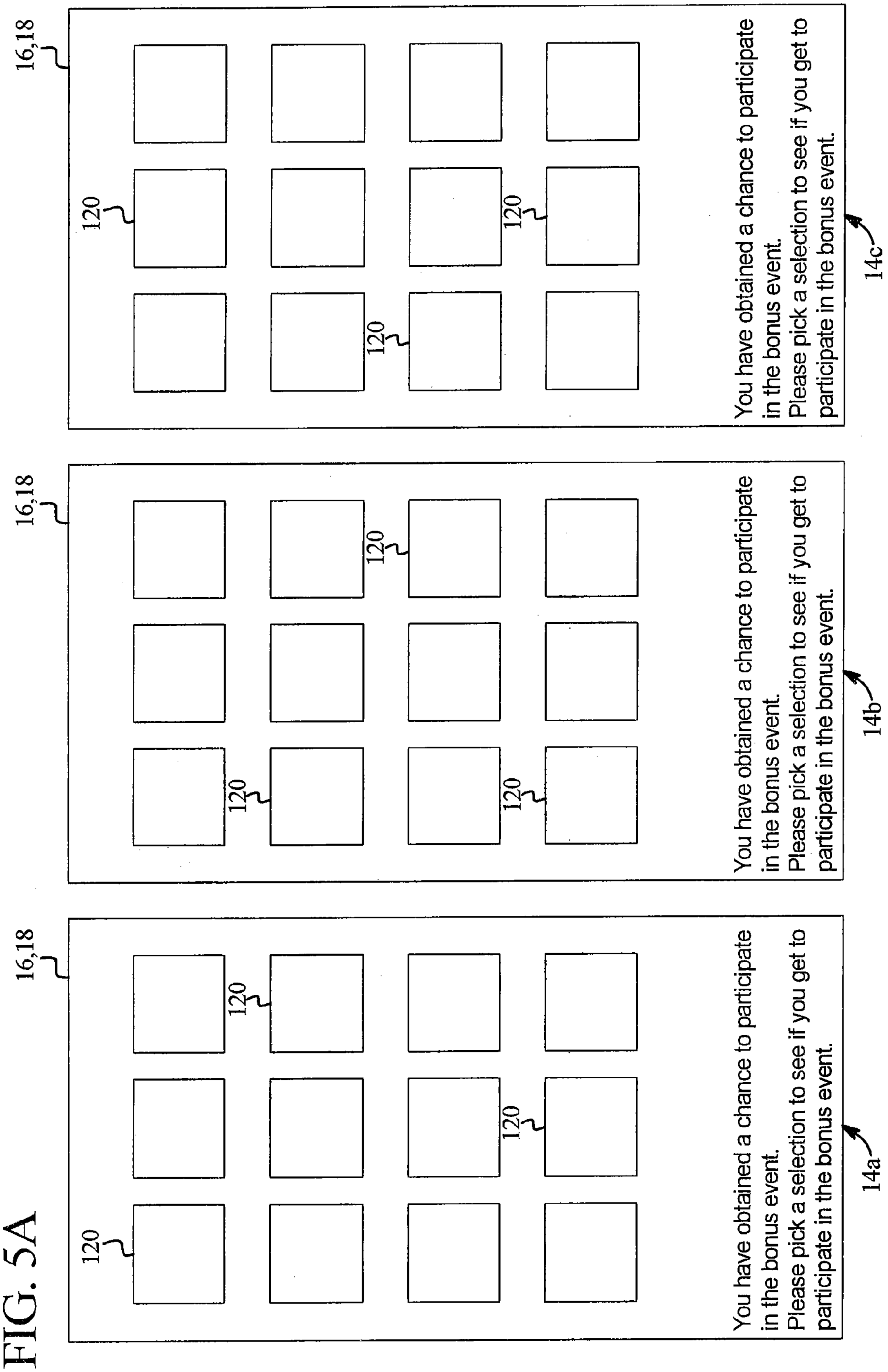
FIGS. 5A, 5B and 5C are top plan views of one embodiment disclosed herein illustrating one bonus event participation gaming sequence provided to a number of gaming devices in the gaming system.
Figure 5B:
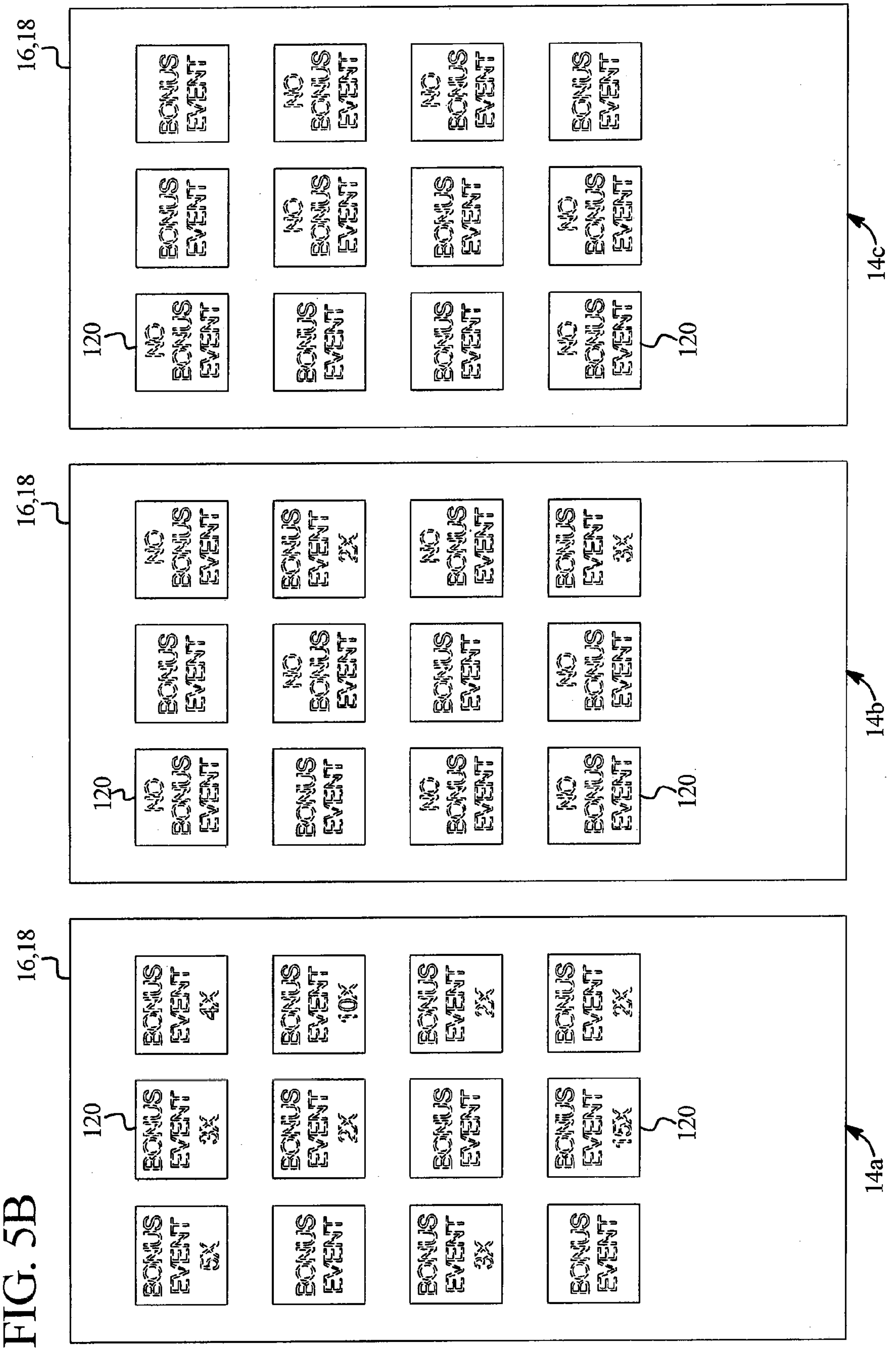
Figure 5C:
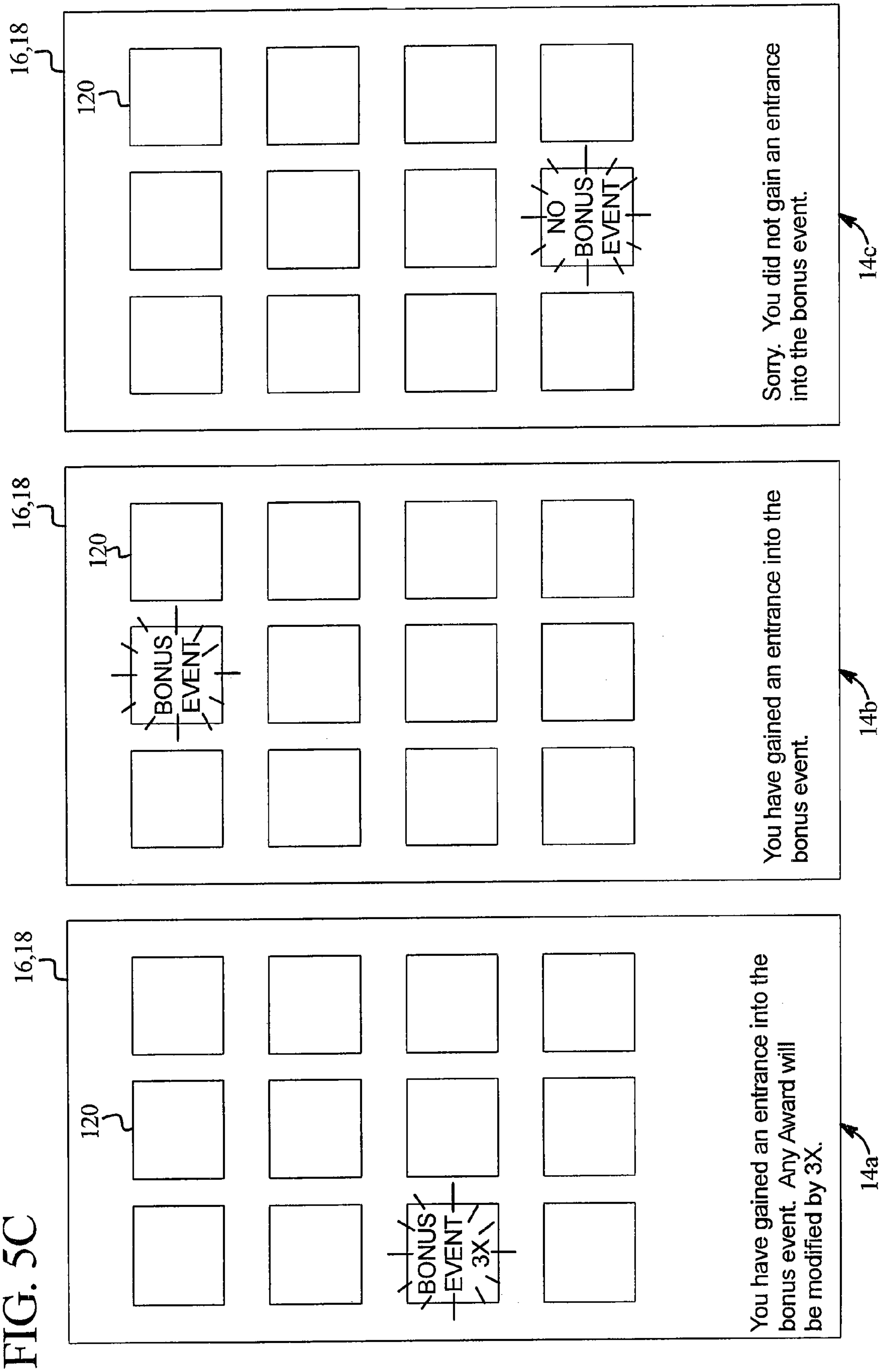

In one embodiment, as illustrated in FIGS. 5A to 5C, the bonus event participation gaming sequence or sub-game includes displaying a plurality of selections to one or more gaming devices which are provided a chance to participate in the bonus event. In this case, as illustrated in FIG. 5A, since auxiliary gaming devices 14*b* and 14*c* qualify for a chance to participate in the bonus event (and gaming device 14*a* is the triggering gaming device which automatically qualifies for a chance to participate in the bonus event), auxiliary gaming devices 14*b* and 14*c* and triggering gaming device 14*a* each display a plurality of selections 120. Each selection is associated with an entry into the bonus event, an entry into the bonus event with an associated modifier or a non-entry into the bonus event. In this embodiment, the odds of each selection being associated with an entry into the bonus event (with or without the associated modifier) is based on the accumulated bonus event pool of that gaming device. Appropriate messages such as "YOU HAVE OBTAINED A CHANCE TO PARTICIPATE IN THE BONUS EVENT" and "PLEASE PICK A SELECTION TO SEE IF YOU GET TO PARTICIPATE IN THE BONUS EVENT" may be provided to the player visually, or through suitable audio or audiovisual displays.

For example, since auxiliary gaming device 14*b* is associated with a 42% chance of success (i.e., an accumulated bonus event pool of 83/200), 42% of the selections displayed by auxiliary gaming device 14*b* (i.e., five of the twelve selections) will be associated with an entry into the bonus event (with or without the associated modifier) and 58% of the selections displayed by auxiliary gaming device 14*b* (i.e., seven of the twelve selections) will be associated with non-entries into the bonus event. In this example, since auxiliary gaming device 14*c* is associated with a 50% chance of success, 50% of the selections displayed by auxiliary gaming device 14*c* (i.e., six of the twelve selections) will be associated with an entry into the bonus event (with or without the associated modifier) and 50% of the selections displayed by auxiliary gaming device 14*c* (i.e., six of the twelve selections) will be associated with non-entries into the bonus event. It should be appreciated that since the triggering gaming device 14*a* is guaranteed entry into the bonus event, each of the plurality of selections displayed by triggering gaming device 14*a* are associated either with an entry into the bonus event or with an entry into the bonus event and an associated modifier. That is, regardless of which selection is picked at the triggering gaming device 14*a*, the player of such triggering gaming device is insured of entrance into the bonus event. FIG. 5B shows the different outcomes associated with each selection. It should be appreciated that these outcomes are shown in phantom for illustration purposes because such outcomes are not actually initially displayed to the player.

In different embodiments, the modifiers, if any, associated with the selections are predetermined, randomly determined, determined based on the player's wager, determined based on the player's status (such as determined through a player tracking system), determined based on a level of a jackpot award, determined based on time or determined based on any other suitable method. In another embodiment, the modifiers, if any, associated with the selections are selected from a range of values or modifiers. In another embodiment, a probability is associated with each modifier and each modifier is associated with a selection based on it's associated probability. In another embodiment, the modifiers associated with the selections for each gaming device are based on the bonus event accumulated wager pool for that gaming device relative to an average expected bonus event payout award determined for that gaming device.

In an alternative embodiment, the central controller (or individual gaming device processor) enables one or more players at one or more gaming devices to accept or reject to participate in a bonus event participation gaming sequence. In this embodiment, if a player rejects to participate in the bonus event participation gaming sequence, the accumulated bonus event pool associated with the player's currently played gaming device is carried over for a subsequent bonus event participation gaming sequence. In another embodiment (not shown), the player's chances of gaining entry into the bonus event is based on the accumulated bonus event pool and an average expected payout of a bonus event award. In this embodiment, if the average payout in the bonus event is one-hundred, an active gaming device with twenty credits accumulated in its associated accumulated bonus event pool is provided a one-in-five chance of qualifying to participate in the bonus event. In this example, if the active gaming device displays ten selections to the player of such gaming device, two selections will be associated with an entry into the bonus event (with or without the associated modifier) and either selections will be associated with non-entries into the bonus event. It should be appreciated that in this example, since the player's chances of gaining entry into the bonus event is based on the accumulated bonus event pool and an average expected payout of a bonus event award either (1) two selections may be associated with an entry into the bonus event (without associated modifiers) or (2) one selection may be associated with an entry into the bonus event (with an associated modifier of 2×) result in the same average expected payout of the bonus event award.

As illustrated in FIG. 5C, after displaying a plurality of selections at one or more active gaming machine, the players at such active gaming machines (including the triggering gaming device 14*a*) are enabled the pick one of the displayed selections. The entry (with or without the associated modifier) or non-entry into the bonus event associated with the picked selection is revealed. In this case, the player at gaming device 14*a* picked a selection associated with an entry (and an associated modifier of 3×), the player at gaming device 14*b* picked a selection association with an entry (without an associated modifier) and the player at gaming device 14*c* picked a selection associated with a non-entry. Appropriate messages such as “YOU HAVE GAINED AN ENTRANCE INTO THE BONUS EVENT” or “SORRY, YOU DID NOT GAIN AN ENTRANCE INTO THE BONUS EVENT” may be provided to the player visually, or through suitable audio or audiovisual displays.

In this embodiment, if a non-entry is revealed, that auxiliary gaming device will not participate in the bonus event. If an entry in the bonus event without an associated modifier is revealed, that auxiliary gaming device will participate in the bonus event and any bonus event award determined during the bonus event will be provided to the player. If an entry in the bonus event with an associated modifier is revealed, that auxiliary gaming device will participate in the bonus event and any bonus event award determined during the bonus event will be modified by the associated modifier and such modified bonus event award will be provided to the player.

After determining which gaming devices will participate in the bonus event, the central controller will initiate the bonus event for each gaming device determined to participate in the bonus event as indicated in block 108 of FIG. 4. In this case, triggering gaming device 14*a* and auxiliary gaming device 14*b* will each provide the initiated bonus event. In one embodiment, a bonus event award, such as a bonus event value, is determined for each gaming device participating in the bonus event as indicated in block 110. For example, a bonus event award of one-hundred is determined for triggering gaming device 14*a* and a bonus event award of two-hundred is determined for auxiliary gaming device 14*b*.

In another embodiment, the gaming system determines, for at least one of the gaming devices, if that gaming device will participate in the bonus event based on a random determination which utilizes that gaming device’s determined odds of success in the bonus event participation sequence. In this embodiment, rather than enabling a player to participate in a bonus event participation sequence, the gaming system determines (based on the determined odds of success in the bonus event participation sequence) for one or more gaming devices whether or not that gaming device will participate in the bonus event. In different embodiments, this determination is displayed to the player, partially displayed to the player or not displayed to (i.e., hidden from) the player.

In one embodiment, each individual gaming device plays the bonus event and determines or generates a bonus event award independent of the central controller and any of the other gaming devices. In another embodiment, the bonus event utilizes a shared device or shared multi-outcome symbol display, such as a wheel positioned adjacent to each of a plurality of adjacently arranged gaming devices, to determine the bonus events awards for each gaming device participating in the bonus event. In one such embodiment, the shared display has a plurality of individual sections and symbols which represent the individual outcomes in the form of bonus event awards displayed at each section. In one such embodiment, the gaming devices of the gaming system are positioned and spaced apart substantially equally about the perimeter of the shared display, wherein the individual outcome or bonus event awards are fixed relative to each other. For example, the wheel may include the following bonus event award values displayed on the slices:

| Slice | Award Value |
|---|---|
| 1 | 50 |
| 2 | 150 |
| 3 | 75 |
| 4 | 125 |
| 5 | 100 |
| 6 | 100 |
| 7 | 5 |
| 8 | 195 |
| 9 | 25 |
| 10 | 175 |

In this example, assuming each slice is equally weighted (i.e., each has an equal probability of being selected), the average expected bonus event award value for the bonus event is the sum of the awards (1000) divided by the total number of awards (10) resulting in an average expected bonus event award value of 100.

In one embodiment, upon the initiation of the bonus event, the gaming system activates the shared display (i.e., causes a wheel to spin) and simultaneously generates a separate or individual outcome (i.e., a bonus event award) associated with each of the gaming devices determined to participate in the bonus event. In one embodiment, the separate outcomes are simultaneously generated or displayed to each player of each gaming device determined to participate in the bonus event. In this embodiment, each gaming device that participates in the bonus event is provided the individual outcome associated with that gaming device. Each gaming device that does not participate in the bonus event is not provided the outcome associated with that gaming device.

In one embodiment, the bonus event award determined for each gaming device participating in the bonus event is based, at least in part, on the accumulated bonus event pool for that gaming device. In one such embodiment, each gaming device’s accumulated bonus event pool is equal to that gaming device’s average expected bonus event award.

In one example of this embodiment, the gaming system includes five players with the following associated accumulated bonus event pools:

| Player | Pool |
|---|---|
| A | 90 |
| B | 150 |
| C | 20 |
| D | 100 |
| E | 275 |

In this example, upon a player triggering the bonus, each of the remaining players receive a bonus selection screen wherein the average expected bonus event award closely matches the value of the player’s accumulated bonus event pool. If the bonus selection screen includes ten selections, the results masked by the selections are tailored specifically for each player so it matches their accumulated bonus event pool.

For example, if Player D triggered the bonus, Player D is automatically entered into the bonus event. In this example, each of the remaining players are provided a bonus event participation gaming sequence to determine whether or not they too will enter the bonus. An example screen for Player A would be as follows (in the actual game embodiment, the values at each selection would be masked or hidden from the player but are shown here for ease of illustration):

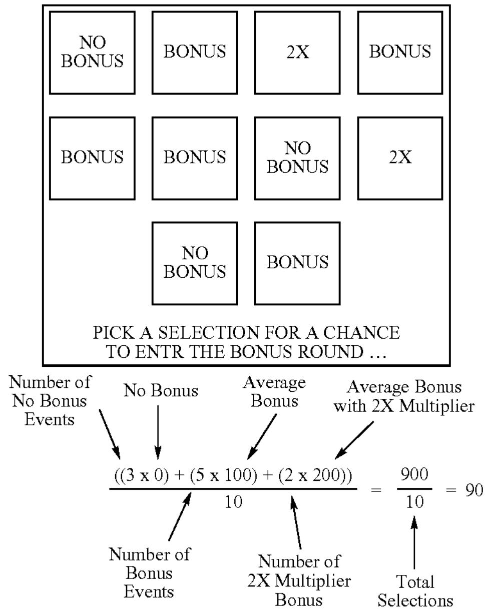

As illustrated, based on which outcomes are associated with which selections, Player A's average expected bonus event award of ninety is equal to Player A's accumulated bonus event pool of ninety. This average expected bonus event award was calculated based upon the above determined average expected bonus event award value of 100 and zero, one or more modifiers which are associated with zero, one or more of the selections. This embodiment takes into account which modifiers, if any, to associate with which selections. It should be further appreciated that in this example, since seven of the selections are associated with entries into the bonus event (with or without modifiers), Player A has a 70% chance of gaining entrance into the bonus event.

This bonus event participating gaming sequence is generated for each of the non-triggering players and the selections are such that each player's average expected bonus event award is equated as close as possible to each player's individual accumulated bonus event pool. For example, based on Player B's accumulated bonus event pool, the ten selections displayed for Player B are associated with one "No Bonus Event", five "Bonus Events", two "2× Bonus Events" and two "3× Bonus Events". In this example, based upon the average expected bonus event award value of 100, Player B's average expected bonus event award is 150 (or ((1×0)+(5×100)+(2×200)+(2×300))/10) which matches Player B's accumulated bonus event pool. Additionally, based on Player C's accumulated bonus event pool, the ten selections displayed for Player C are associated eight "No Bonus Event" and two "Bonus Events". In this example, based upon the average expected bonus event award value of 100, Player C's average expected bonus event award is 20 (or ((8×0)+(2×100))/10) which matches Player C's accumulated bonus event pool.

Moreover, based on Player E's accumulated bonus event pool, the ten selections displayed for Player E are associated with may be zero "No Bonus Events", two "Bonus Events", two "2× Bonus Events", four "3× Bonus Events", one "4× Bonus Event" and one "5× Bonus Event". In this example, based upon the average expected bonus event award value of 100, Player E's a average expected bonus event award is 270 or (((0×0)+(2×100)+(3×200)+(4×300)+(1×500))/10) which does not perfectly match Player E's accumulated bonus event pool of 275. This special case will be accounted for in the determination of a remainder to remain in Player E's accumulated bonus event pool as discussed in detail below.

It should be appreciated that because of the high value Player E's accumulated bonus event pool, Player E is guaranteed an entry into the bonus (i.e., zero "No Bonus Event" selections exist in their selection screen). On the other hand, each of the remaining players are guaranteed a chance to win an entry into the bonus event with the chance of entry into the bonus event directly related to their accumulated bonus event pools as shown above. This chance is a computation of the number of selections which grant entry into the bonus in relation to the total number of selections. For example, Player B has a 90% chance of entry (nine selections that grant entry in relation to ten selections overall) into the bonus event. It should be appreciated that this data could be displayed to the player in a form of a grid to encourage wagering or merely as an informative courtesy to the player to inform them of their chance of entering the bonus if it is triggered by another player.

Likewise, as indicated above, even though Player D is guaranteed entry into the bonus game because they are the triggering player (i.e., the gaming device Player D is playing is designated the triggering gaming device), Player D's bonus event participation gaming sequence is utilizes to determine a possible modifier or multiplier of any bonus event award Player D obtains in the bonus event.

In one embodiment, after the bonus event ends, the gaming device accumulated bonus event pool for each active gaming device that participated in the actual bonus event is decreased or reduced by a theoretical average expected bonus event award regardless of the actual bonus event award provided to the player. In this embodiment, upon the triggering of the bonus event, for each active gaming device, a theoretical average expected bonus event award is determined based on the accumulated bonus event pool of that gaming device and it is this theoretical average expected bonus event award (and not the actual bonus event award) which is subtracted from the accumulated bonus event pool.

In one such embodiment, before, during or after each of the players completing the bonus event participation gaming sequence, each player's the average expected bonus event award (used in the selection entry calculation defined above) is subtracted from each player's accumulated bonus event pool. In one embodiment, the player who triggered the bonus event (i.e., the player currently playing the gaming device designated as the triggering gaming device) does not have their accumulated bonus event pool reduced. In this embodiment, the player who triggered the bonus event received the trigger during the play of the primary game and thus the paytable of the primary game accounts for the bonus event award provided to this player. In the current example, each player's accumulated bonus event pools is reduced by that player's average expected bonus event award (determined above) to yield the following:

| Player | Pool |
|---|---|
| A | 0 |
| B | 0 |
| C | 0 |
| D | 100 |
| E | 5 |

As is shown above, Player E still has 5 monetary units remaining in their accumulated bonus event pool because of the remainder which occurred when their average expected bonus event award did not perfectly match Player E's accumulated bonus event pool. As further shown above, the accumulated bonus event pool for Player D is not reduced because Player D is designated as the triggering player and thus their bonus event is funded by a different pool (or alternatively by the paytable associated with a primary game they are playing).

Following the above described example, each eligible player qualifies to participate in the bonus event. For instance, Player C and triggering Player D both qualified without any associated modifier and Player E qualified with an associated modifier of 3×. Accordingly, Player C and Player E enter the bonus event along with Player D and all three actively participate in the bonus event (Players A and B failed to qualify during the bonus event participation gaming sequence and thus would not participate in the bonus event). It should be appreciated that since Player's A & B have a theoretical average expected bonus event award, the accumulated bonus event pool for Player's A and B is reset accordingly. In one example of a bonus event, Player C is provided an actual bonus event award of 175, Player E is provided an actual award of 25 and Player D is provided an actual award of 150. After applying the qualification multipliers, the resulting payouts would be 175 credits for Player C, (25×3) or 75 credits for Player E and 150 credits for Player D.

As shown above, the accumulated bonus event pool affects a player's chance of qualifying for a bonus event and a potential modifier, not the actual award they receive in the bonus event. In the above example, Player C had the lowest accumulated bonus event pool, but was provided the largest award while Player E had the largest accumulated bonus event pool and was provided the smallest award (of the players participating in the bonus event). Likewise, the triggering player is only guaranteed an award in the bonus event and is not assured of getting the largest award in the bonus event.

In the above example, the total award provided to the non-triggering players was 225 credits. As discussed above, each player's average expected bonus event award was subtracted from the wager pool to fund the bonus event for the non-triggering players. Thus, the total credits allocated for funding the bonus event in this example was 530 or (90+150+20+270). In one embodiment, any difference between the average expected bonus event awards allocated for funding the bonus for non-triggering players and the actual bonus event awards is allocated to a designated pool as a remainder. This remainder pool can be earmarked by the gaming system designer for any one or more of a number of uses, such as providing occasional bonuses to the players, funding one or more progressive awards, stored for backup use in case an actual bonus event award exceeds the average expected bonus event awards or be used in any other suitable manner.

In another embodiment, after each bonus event, the gaming device accumulated bonus event pool for each active gaming device that participate in the actual bonus event is reset to a designated amount, such as zero. In another embodiment, after each bonus event, the gaming device accumulated bonus event pool for each active gaming device which participated in the bonus event participation gaming sequence is reset to a designated amount, such as zero. In another embodiment, after each bonus event, the gaming device accumulated bonus event pool for one, more or each active gaming device is reset to a designated amount, such as zero. In another embodiment, after each bonus event, the gaming device accumulated bonus event pool for the triggering gaming device is reset to a designated amount, such as zero. In another embodiment, after each bonus event, the gaming device accumulated bonus event pool for the triggering gaming device is not reset to a designated amount. In this embodiment, since the bonus event award provided to the player of the triggering gaming device is not funded via the triggering gaming device's accumulated bonus event pool, but is alternatively funded, the triggering gaming device's accumulated bonus event pool need not be reset.

In an alternative embodiment, the central controller (or individual gaming device processor) enables one or more players at one or more gaming devices to accept or reject the bonus event award determined for that player. In this embodiment, if a player rejects a determined bonus event award, no bonus event award is provided to that player and the accumulated bonus event pool associated with the player's currently played gaming device is carried over for a subsequent bonus event participation gaming sequence.

In another embodiment, an independent bonus event award is determined for each participating gaming device. In another embodiment, one, more or each bonus event awards is determined, at least in part, on one of the bonus event awards determined at least one of the other participating gaming devices in the gaming system. In one such embodiment, the bonus event utilizes a shared device, such as a wheel to determine one, more or each bonus event awards. It should be appreciated that any suitable manner of determining a bonus event award may be implemented.

In one embodiment, the bonus event award provided at each gaming device is different. In another embodiment, the bonus event award provided at a plurality of gaming devices are different. In another embodiment, the bonus event award provided at each gaming device is the same. In another embodiment, the bonus event award provided at a plurality of gaming devices are the same.

After determining a bonus event award for each participating gaming device, any revealed modifiers are appropriately applied to any bonus event awards as indicated in block 112. That is, if a player picked selection revealed an associated modifier, the revealed modifier is applied to the bonus event award determined for such gaming device. In this case, since the player at triggering gaming device **14*a* picked a selection during the bonus event participation gaming sequence associated with a modifier of 3×, the bonus event award of one-hundred determined for triggering gaming device 14*a* is modified by the associated modifier of 3× to result in a modified bonus event award of three-hundred. Since the player at auxiliary gaming device 14*b* picked a selection during the bonus event participation gaming sequence not associated with a modifier, the bonus event award of two-hundred determined for auxiliary gaming device 14*b* is not modified. Each of the bonus event awards (whether modified or not) are provided to the respective players at the appropriate gaming devices and the bonus event ends as indicated in blocks 114 and 116**, respectively.

In an alternative embodiment, the gaming system enables players at the gaming devices to place side bets which directly fund the accumulated bonus event pool of the player's respective gaming device. In this embodiment, as described above, the greater a gaming device's accumulated bonus event pool, the greater the chances of the player of the gaming device of qualifying for the bonus event and the greater the chances of the player of the gaming device obtaining a modifier during the bonus event participation gaming sequence. It should be appreciated that since the monetary units allocated to each accumulated bonus event pool are theoretically completely paid back to the player, the gaming system provides for the players to increase accumulated bonus event pools without otherwise affecting the payout percentages for the underlying primary or secondary games. In one embodiment, each placed side wager must be at least a designated amount to directly fund an accumulated bonus event pool.

As described above, each gaming device is associated with an accumulated bonus event pool and each bonus event has an average expected payout or value based on the probabilities and award amounts for that bonus event. In one embodiment, one or more players at one or more gaming devices are offered a buy-in to participate in the bonus event. In one such embodiment, the buy-in offered to the player is based on the amount in the accumulated bonus event pool associated with the player's currently played gaming device in relation to the average expected payout for the bonus event. For example, if the average expected payout for a bonus event is determined to be $3.00 and the accumulated bonus event pool associated with the player's currently played gaming device is $1.50, then a buy-in wager amount of $1.50 is offered to the player. That is, instead of providing the player a 50% chance ($1.50/$3.00) of participating in the bonus event (as described above), this embodiment provides for the player to make the choice if they want to participate in the bonus event and if so, pay any difference required.

In another such embodiment, even if the player's accumulated bonus event pool is greater than the average expected payout for the bonus event, the gaming system enables the player to buy-in to participate in the bonus event with an applicable bonus modifier. For example, if the average expected payout for a bonus event is determined to be $3.00 and the accumulated bonus event pool associated with the player's currently played gaming device is $4.50, then the player is given the option of either participating in the bonus event with an applicable modifier of 1× (i.e., no bonus modifier) or purchasing a $1.50 buy-in to participate in the bonus event with an applicable modifier of 2× (i.e. the buy-in accounts for the 1× bonus modifier). Such embodiments enable all players the opportunity to participate in the bonus event for each and every bonus event and also provides those players who wager more (and thus have larger accumulated bonus event pools) with a smaller buy-in than those who have wagered less.

In one embodiment wherein at least one gaming device is a multi-denomination gaming device (or a plurality of gaming devices are each enabling player's to wager different denomination amounts), the gaming system converts the average expected payout of the bonus event from credits to a dollar amount (i.e., credits×denomination=dollar amount). In this embodiment, if the accumulated bonus event pool is metered or tracked in dollar amounts, for a player to buy-in to participate in a bonus event, the gaming system enables the player to place a buy-in wager amount (in dollars) based on the difference between the average expected payout of the bonus event (in dollars) and the player's accumulated bonus event pool (in dollars).

Figure 6:
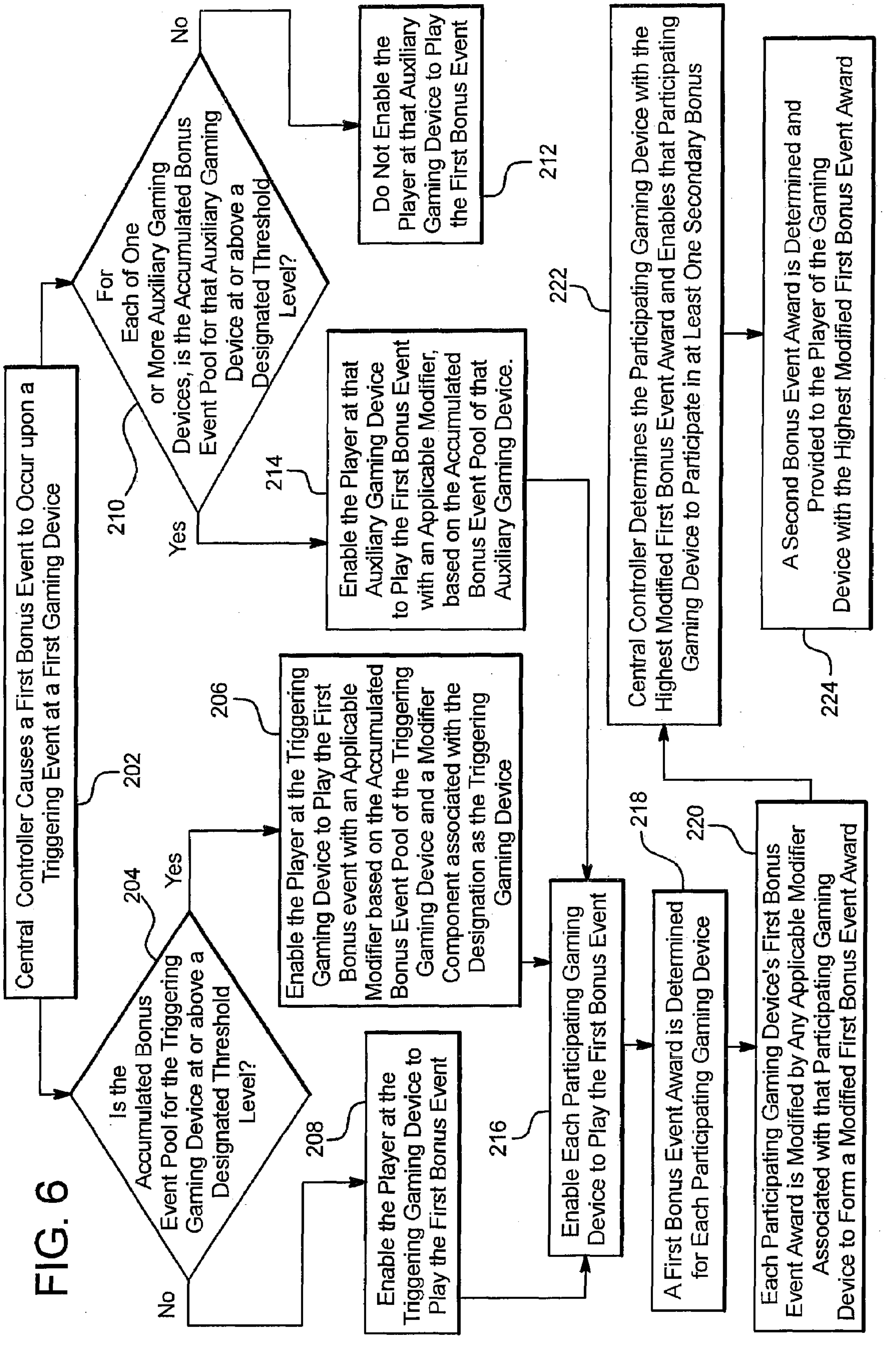
FIG. 6 is a flowchart of one alternative embodiment of the gaming system disclosed herein illustrating the triggering of a first bonus event to the providing of a second bonus event award.

In an alternative embodiment, upon a suitable triggering event at a first gaming device (i.e., the gaming device designated as the triggering gaming device for this first bonus event), the central controller causes a first bonus event to occur as indicated in block 202 of FIG. 6. As described above, in different embodiments, the first bonus triggering event is a symbol-driven event (i.e., the generation of a designated symbol or symbol combination in a primary game of the triggering gaming device), a non symbol-driven event (i.e., an event which occurs independent of any game play event which may occur in any primary game or any secondary game played) or any other suitable event.

In one embodiment, upon a suitable first bonus triggering event occurring, as indicated in diamond 204, the central controller determines if the accumulated bonus event pool for the triggering gaming device is at or above a designated threshold level, such as a designated threshold wager level. In different embodiments, the designated threshold level for the triggering gaming device is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

If the accumulated bonus event pool for the triggering gaming device is at or above (i.e., reaches) the designated threshold wager level, as indicated in block 206 of FIG. 6, the gaming system enables the player at the triggering gaming device to play or participate in the first bonus event with an applicable modifier to apply to any outcomes generated in the first bonus event. In this embodiment, the determination of an applicable modifier, such as a multiplier, is based on the accumulated bonus event pool of the triggering gaming device and an additional modifier component associated with being designated as the triggering gaming device. In one such embodiment, the applicable modifier based on the accumulated bonus event pool is based on a multiple of the gaming device's accumulated bonus event pool with respect to the designated threshold wager level. In this embodiment, the additional modifier component associated with being designated as the triggering gaming device increases the applicable modifier applied to any first bonus event award, which (as described below) increases the triggering gaming device's probability of participating in a second bonus event (and being provided a second bonus event award).

For example, if the designated threshold wager level is 50 monetary units and gaming device 14*a* (and its associated accumulated bonus event pool of 50 monetary units) from FIG. 1 is the triggering gaming device, then upon a suitable first bonus triggering event, the central controller enables gaming device 14*a* to participate in the first bonus event wherein any first bonus event award for gaming device 14*a* is modified by any applicable modifier of 2×. In this example, the applicable modifier is formed from the combination of an accumulated bonus event pool multiplier of 1× (based on the accumulated bonus event pool of 50 monetary units associated with gaming device 14*a*) and a triggering gaming device multiplier of 1× (which is associated with being designated as the triggering gaming device). In another example, if the designated threshold wager level is 50 monetary units and gaming device 14*c* (and its associated accumulated bonus event pool of 100 monetary units) from FIG. 1 is the triggering gaming device, then upon a suitable first bonus triggering event, the central controller enables gaming device 14*c* to participate in the first bonus event wherein any first bonus event award for gaming device 14*c* is modified by any applicable modifier of 3×. In this example, the applicable modifier is formed from the combination of an accumulated bonus event pool multiplier of 2× (based on the accumulated bonus event pool of 100 monetary units associated with gaming device 14*c*) and a triggering gaming device multiplier of 1× (which is associated with being designated as the triggering gaming device).

In different embodiments, the additional modifier component associated with being designated as the triggering gaming device is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more additional pools, or determined based on any other suitable method or criteria.

As indicated in block 208, if the accumulated bonus event pool for the triggering gaming device is below the designated threshold wager level, in one embodiment, the central controller enables the player at the triggering gaming device to play or participate in the first bonus event without any applicable modifier. For example, if the designated threshold wager level is 50 monetary units and gaming device 14*z* (and its associated accumulated bonus event pool of 5 monetary units) from FIG. 1 is the triggering gaming device, then upon a suitable first bonus triggering event, the central controller enables gaming device 14*z* to participate in the first bonus event (wherein any first bonus event award for gaming device 14*z* is not modified by any applicable modifier).

In one alternative embodiment, if the accumulated bonus event pool for the triggering gaming device is below the designated threshold wager level, the gaming system enables the player at the triggering gaming device to play or participate in the first bonus event wherein any determined awards or outcomes in the first bonus event are modified by an applicable modifier based on the accumulated bonus event pool of the triggering gaming device (and not modified by any additional modifier component associated with being designated as the triggering gaming device). In another alternative embodiment, if the accumulated bonus event pool for the triggering gaming device is below the designated threshold wager level, the gaming system enables the player at the triggering gaming device to play or participate in the first bonus event wherein any determined awards or outcomes in the first bonus event are modified by an additional modifier component associated with being designated as the triggering gaming device (and not modified by a modifier based on the accumulated bonus event pool of the triggering gaming device).

In this embodiment, in addition to determining if the accumulated bonus event pool for the triggering gaming device is at or above the designated threshold wager level, for each of one or more auxiliary gaming devices, the central controller determines if the accumulated bonus event pool for that auxiliary gaming device is at or above a designated threshold level, such as a designated threshold wager level as indicated in diamond 210.

In one embodiment, the designated threshold level is different for a plurality of the auxiliary gaming devices. In another embodiment, the designated threshold level is different for each of the auxiliary gaming devices. In another embodiment, the designated threshold level is the same for each of the auxiliary gaming devices. In another embodiment, the designated threshold level for one or more of the auxiliary gaming devices is the same as the designated threshold level for the triggering gaming device. In another embodiment, the designated threshold level for one or more of the auxiliary gaming devices is different than the designated threshold level for the triggering gaming device. In different embodiments, the designated threshold level for each of the auxiliary gaming devices is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

As indicated in block 212 of FIG. 6, if the accumulated bonus event pool for an auxiliary gaming device is below the designated threshold wager level, the central controller does not enable the player at that auxiliary gaming device to play or participate in the first bonus event. For example, if the designated threshold wager level is 50 monetary units and gaming device 14*z* (and its associated accumulated bonus event pool of 5 monetary units) from FIG. 1 is an auxiliary gaming device, then upon a suitable first bonus triggering event, the central controller does not enable auxiliary gaming device 14*z* to participate in the first bonus event.

If the accumulated bonus event pool for an auxiliary gaming device is at or above the designated threshold wager level, as indicated in block 214, the central controller enables the player at that auxiliary gaming device to play or participate in the first bonus event with an applicable modifier, such as a multiplier, to apply to any outcomes generated in the first bonus event. In this embodiment, the determination of an applicable modifier is based on the accumulated bonus event pool of that auxiliary gaming device. In one such embodiment, the applicable modifier is based on a multiple of the gaming device's accumulated bonus event pool with respect to the designated threshold wager level. Accordingly, the greater the gaming device's accumulated bonus event pool, the greater the applicable modifier applied to any first bonus event award and (as described below) the greater the probability that the gaming device will participate in a second bonus event (and win a second bonus event award).

For example, if the designated threshold wager level is 50 monetary units and gaming device 14*a* (and its associated accumulated bonus event pool of 50 monetary units) from FIG. 1 is an auxiliary gaming device, then upon a suitable first bonus triggering event, the central controller enables gaming device 14*a* to participate in the first bonus event wherein any first bonus event award for gaming device 14*a* is modified by any applicable modifier of 1× which is based on the accumulated bonus event pool of 50 monetary units associated with gaming device 14*a*. In another example, if the designated threshold wager level is 50 monetary units and gaming device 14*c* (and its associated accumulated bonus event pool of 100 monetary units) from FIG. 1 is an auxiliary gaming device, then upon a suitable first bonus triggering event, the central controller enables gaming device 14*c* to participate in the first bonus event wherein any first bonus event award for gaming device 14*c* is modified by any applicable modifier of 2× which is based on the accumulated bonus event pool of 100 monetary units associated with gaming device 14*c*. In one such embodiment, the designated threshold wager level is determined based on the average expected payout of the first bonus event, wherein each time a gaming device's accumulated bonus event pool increases to an additional multiple of the designated threshold wager level, an applicable modifier will increase accordingly. For example, if the average expected payout for the first bonus event is 50 monetary units, then every 50 monetary units accumulated in a gaming device's accumulated bonus event pool causes any applicable modifier associated with that gaming device to increase by a suitable factor, such as 1.

After determining which gaming devices to participate in the first bonus event and any applicable modifiers to apply to any first bonus event awards or outcomes generated in the first bonus event, the gaming system enables each participating gaming device (i.e., the triggering gaming device and zero, one or more auxiliary gaming devices with accumulated bonus event pools greater than the designated threshold level) to play or participate in the first bonus event as indicated in block 216. Such a configuration enables a plurality of gaming devices to simultaneously (or substantially simultaneously) participate in a group bonus event.

In different embodiments, the first bonus event may be any suitable type of game including, but not limited to, reel/slot games, card games (e.g., poker, blackjack), lottery games, selection games, offer and acceptance games, wheel games, dice games, free spin games, competition games, skill games or perceived skill games. In one embodiment, the first bonus event includes one or more rounds of game play, wherein any awards determined over a plurality of rounds form the first bonus event award for that gaming device. In different embodiments, the first bonus event each participating gaming device provides is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In the first bonus event, a first bonus event award is determined for each participating gaming device as indicated in block 218 of FIG. 6. In one embodiment, each participating gaming device determines the first bonus event award for that gaming device. In another embodiment, the central controller determines the first bonus event award for one or more of the participating gaming devices. In another embodiment, for at least one of the first bonus awards, the central controller determines part of the first bonus event award and a gaming device determines part of the first bonus award.

After a first bonus event award is determined for each participating gaming device, as indicated in block 220, each participating gaming device's first bonus event award is modified by any applicable modifier associated with that participating gaming device to form a modified first bonus event award. It should be appreciated that for any participating gaming devices without an applicable modifier, a modifier of 1× is utilized to form a modified first bonus event award. In one embodiment, for one, more of each of the participating gaming devices, the modified first bonus event award is provided to the player of that gaming device. In another embodiment, for one, more of each of the participating gaming devices, the modified first bonus event award is not provided to the player of that gaming device.

In one alternative embodiment, in addition to or in lieu of utilizing each participating gaming device's associated accumulated bonus event pool to determine any applicable modifier, one or more gaming devices utilize their respective associated accumulated bonus event pool to determine one or more aspects of the first bonus event provided at that gaming device. In one example embodiment, a gaming device uses its associated accumulated bonus event pool to determine a number of reel spins to provide to a player in the first bonus event. In another example embodiment, a gaming device uses its associated accumulated bonus event pool to determine one or more awards available to a player in the first bonus event.

In one embodiment, after determining a modified first bonus event award for each gaming device that participated in the first bonus event, the central controller selects one of the gaming devices that participated in the first bonus event to participate in at least one second bonus event. In one such embodiment, the central controller selects one of the participating gaming devices based, at least in part, on that gaming device's modified first bonus event award. In another embodiment, the central controller is programmed to select one of the gaming devices which participated in the first bonus event (to participate in the second bonus event) based on any one or more suitable criteria. In different embodiments, the gaming device selected to participate in the second bonus event is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In one such embodiment, the central controller determines the participating gaming device with the highest or greatest modified first bonus event award and enables that participating gaming device to participate in at least one second bonus event as indicated in block 222 of FIG. 6. For example, if auxiliary gaming device **14*a* determines a first bonus event award of 100 monetary units and auxiliary gaming device 14*c* also determines a first bonus event award of 100 monetary units, and if gaming device 14*a* is associated with an applicable modifier of 1× (based on the accumulated bonus event pool of gaming device 14*a*) and gaming device 14*c* is associated with an applicable modifier of 2× (based on the accumulated bonus event pool of gaming device 14*c*), then gaming device 14*c* has a higher modified first bonus event award (i.e., 200 monetary units) than the modified first bonus event award for gaming device 14*a* (i.e., 100 monetary units) and gaming device 14*c*** is determined to participate in the second bonus event.

In another example, a triggering gaming device determines a first bonus event award of 100 monetary units and an auxiliary gaming device also determines a first bonus event award of 100 monetary units. In this example, if the triggering gaming device is associated with an applicable modifier of 3× (based on a modifier of 1× associated with an accumulated bonus event pool of 50 monetary units and a modifier of 2× associated with being designated the triggering gaming device) and the auxiliary gaming device is associated with an applicable modifier of 2× (based on the accumulated bonus event pool of 100 monetary units), then the triggering gaming device's modified first bonus event award (i.e., 300 monetary units) is greater than the auxiliary gaming device's modified first bonus event award (i.e., 200 monetary units) and the triggering gaming device is determined to participate in the second bonus event (even though the auxiliary gaming device had a higher accumulated bonus event pool).

It should be appreciated that in this embodiment, the gaming system provides a plurality of bonus events wherein a player's level of game play prior to any of the bonus events determines, at least in part, a probability of that player's gaming device participating in a second bonus event and winning a second bonus event award. That is, in this embodiment, since a participating gaming device's applicable modifier is based on that gaming device's accumulated bonus event pool and the participating gaming device's modified first bonus event award is based on the applicable modifier, a participating gaming device's probability of participating in a second bonus event (and winning a second bonus event award) is based, at least in part, on the participating gaming device's accumulated bonus event pool.

In one embodiment, the second bonus event is different than the first bonus event. In another embodiment, the second bonus event is the same as the first bonus event. In different embodiments, the second bonus event may be any suitable type of game including, but not limited to, reel/slot games, card games (e.g., poker, blackjack), lottery games, selection games, offer and acceptance games, wheel games, dice games, free spin games, competition games, skill games or perceived skill games. In one embodiment, the second bonus event includes one or more rounds of game play, wherein any awards determined over a plurality of rounds form a second bonus event award for that gaming device.

As indicated in block 224 of FIG. 6, in this embodiment, a second bonus event award is determined and provided to the player of the gaming device with the highest modified first bonus event award. In one embodiment, the gaming device with the highest modified first bonus event award determines the second bonus event award. In another embodiment, the central controller determines the second bonus event award. In another embodiment, the gaming device with the highest modified first bonus event award determines at least part of and the central controller determines at least part of the second bonus event award. It should be appreciated that the second bonus event award may be determined in any suitable manner.

Figure 7:
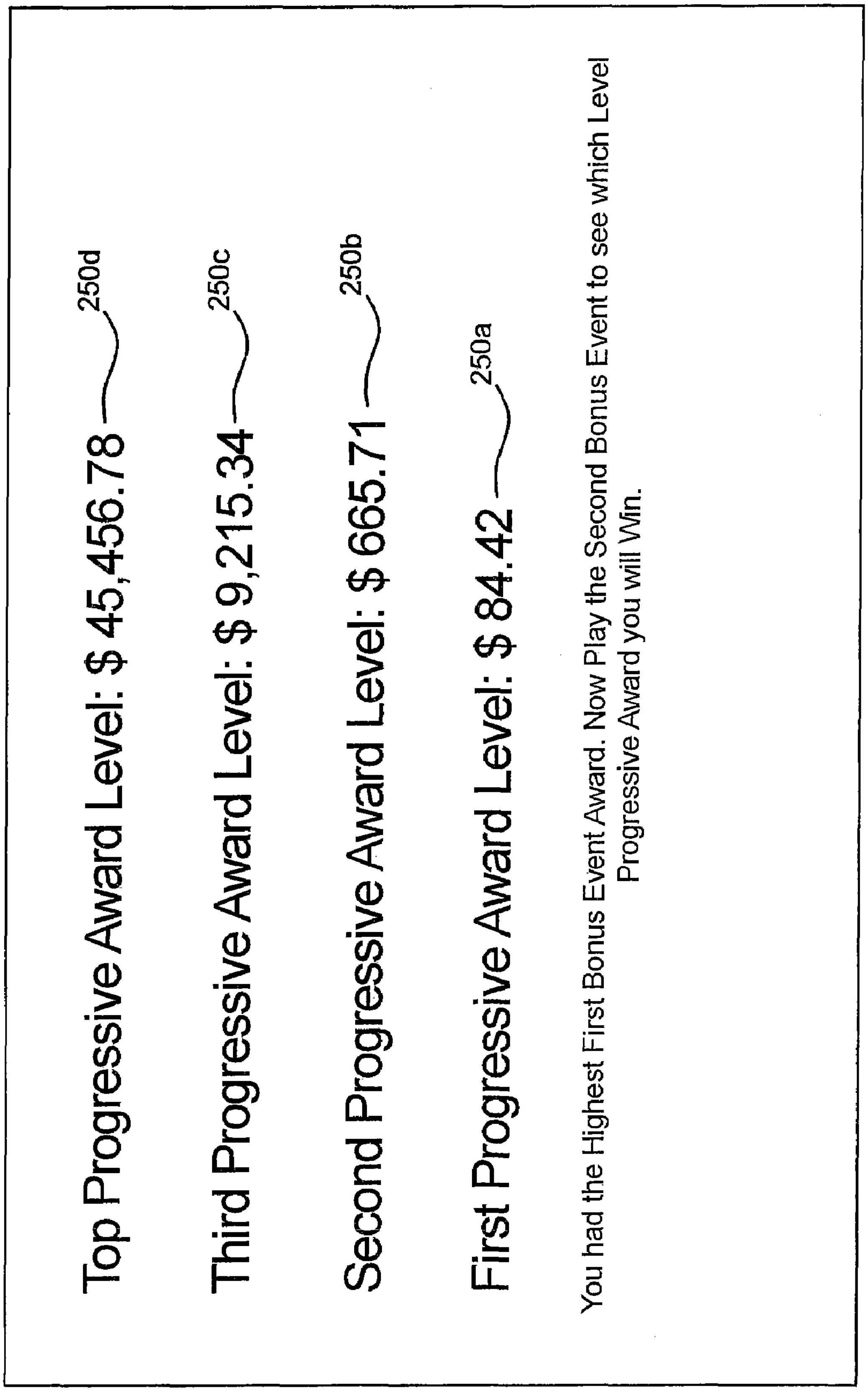
FIG. 7 is a top plan view of one alternative embodiment disclosed herein illustrating the different progressive awards which may be provided as a second bonus event award to the player of the gaming device with the highest first bonus event award.

In one such embodiment, the gaming device's outcome in the second bonus event determines which of the plurality of progressive awards in an MLP configuration is provided to the player. In this embodiment, as seen in FIG. 7, the gaming system maintains a plurality of progressive awards 250*a* to 250*d* in a multi-level progressive configuration. In this embodiment, the gaming device provides the player of the gaming device with the highest modified first bonus event award one or more outcomes in the second bonus event, wherein the outcome(s) of the second bonus event determine which level of the MLP (and which associated progressive award) is provided to the player. It should be appreciated that any suitable manner of determining which level of the MLP is provided to the player may be implemented in accordance with the present disclosure. Appropriate messages such as "YOU HAD THE HIGHEST FIRST BONUS EVENT AWARD" and "NOW PLAY THE SECOND BONUS EVENT TO SEE WHICH LEVEL PROGRESSIVE AWARD YOU WIN" may be provided to the player visually, or through suitable audio or audiovisual displays. Accordingly, this embodiment enables a number of players to participate in a first bonus event, wherein one of those players is enabled to further participate in a second bonus event to win one of a plurality of progressive awards of a multi-level progressive award configuration.

In another embodiment, when one player at one gaming device triggers a first bonus event or first bonus game, the central controller enables all the players at all the gaming devices in the gaming system to participate in the first bonus event or first bonus game. In another embodiment, when one player at one gaming device triggers a first bonus event or first bonus game, the central controller enables the players at all the active gaming devices in the gaming system to participate in the first bonus event or first bonus game.

In one embodiment, for a plurality of the participating gaming devices, the play of the first bonus game is different. In another embodiment, for each of the participating gaming devices, the play of the first bonus game is different. In another embodiment, for a plurality of the participating gaming devices, the play of the first bonus game is the same. In another embodiment, for each of the participating gaming devices, the play of the first bonus game is the same.

In one embodiment, for each participating gaming device, the play of the first bonus event is dependent on the accumulated bonus event pool for that gaming device. In one such embodiment, the accumulated bonus event pool associated with a specific participating gaming device determines the number of spins of a wheel or reel and/or any applicable modifier in the first bonus game for that specific gaming device. In these embodiments, each participating gaming device plays its respective first bonus game to determine a first bonus game outcome or award.

In one embodiment, the value or amount in a participating gaming device's accumulated bonus event pool is provided, at least in part, to the player of that gaming device as the first bonus game outcome. In one such embodiment, if the entire amount or value in the accumulated bonus event pool associated with a gaming device is not provided to the player of that gaming device as the first bonus game outcome, any remainder in the accumulated bonus event pool associated with that gaming device is applied to or otherwise rolls over into the gaming device's accumulated bonus event pool for a subsequently triggered bonus game.

In one embodiment, after determining a first bonus game outcome for each participating gaming device, the central controller compares the results from the first bonus game for each gaming device to determine a winning gaming device for the first bonus game. The central controller compares the results from each first bonus game played and determines a winning gaming device based on any suitable criteria. In this embodiment, the central controller enables the winning gaming device of the first bonus game to participate in a second bonus event or second bonus game. In one such embodiment, the winning gaming device of the first bonus game plays or participates in the second bonus game, wherein the play of the second bonus game determines which progressive award of an MLP configuration is provided to the player of the winning gaming device of the first bonus game. That is, this embodiment provides that a plurality of gaming devices participate in a first bonus game, wherein a winning gaming device of the first bonus game (which is determined, at least in part, based on the accumulated bonus event pool of that gaming device) is enabled to play a second bonus game for one or more progressive awards.

Figure 8:
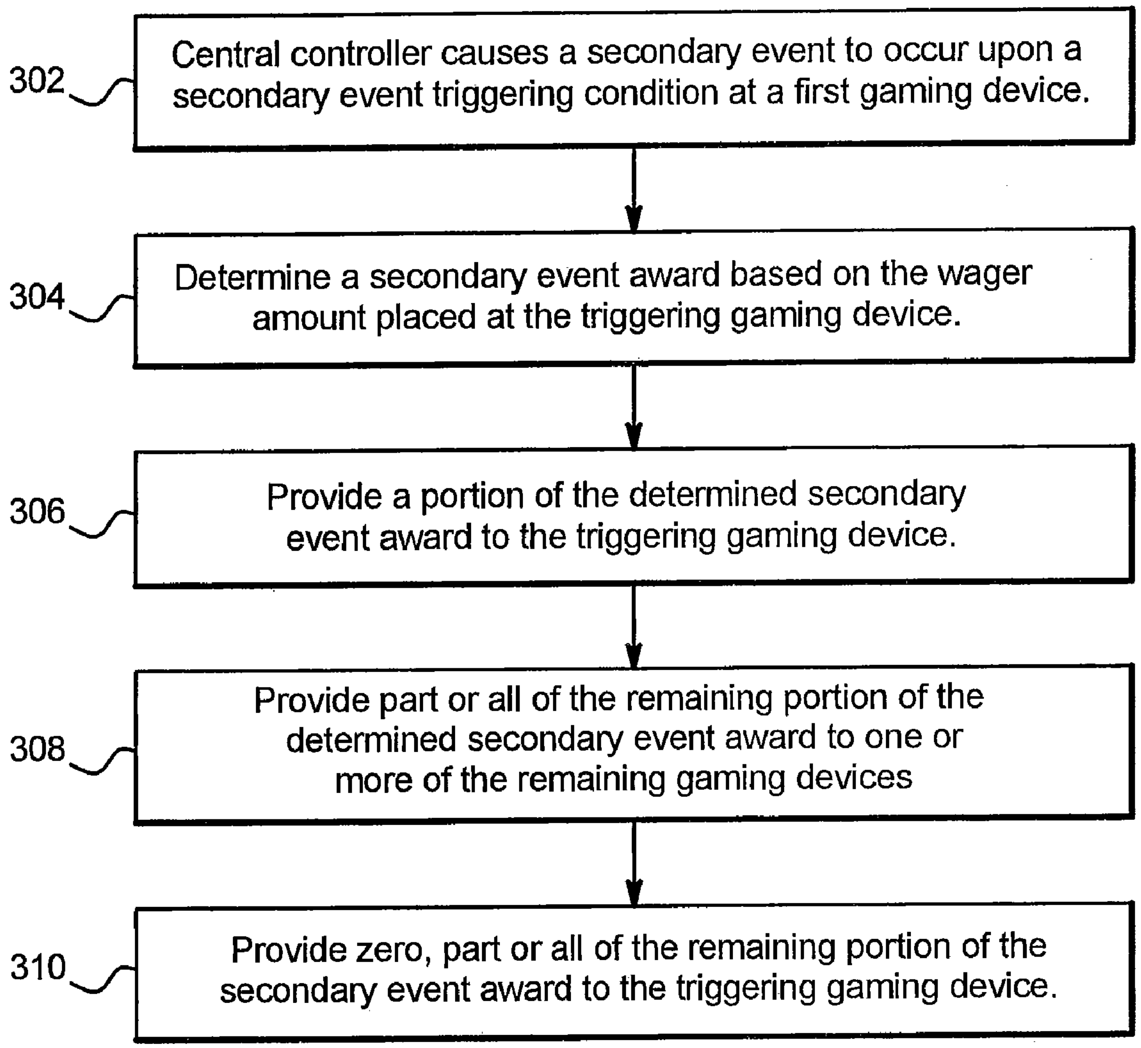
FIG. 8 is a flowchart of one alternative embodiment of the gaming system disclosed herein illustrating a secondary event award distributed amongst a plurality of players at a plurality of gaming devices in the gaming system.

In another embodiment, as seen in FIG. 8, upon a suitable secondary event triggering condition at a first gaming device, the central controller causes a secondary event to occur as indicated in block 302. In this embodiment, the central controller designates the first gaming device as the triggering gaming device. In one embodiment, the secondary event triggering condition is the generation of a designated symbol or symbol combination in a primary game of the triggering gaming device. In another embodiment, the secondary event triggering condition occurs independent of any game play event which may occur in any primary game or any secondary game played at one or more of the gaming devices in the gaming system. In one such embodiment, the secondary event triggering condition which occurs independent of any game play event is triggered independent of any wager amounts placed. That is, in this embodiment, the odds of the secondary event triggering condition occurring in association with a play of a gaming device are the same regardless of the amount of the wager placed.

In one embodiment, after the suitable secondary event triggering condition occurs, the gaming system determines a secondary event award as indicated in block 304. In one such embodiment, the central controller determines the secondary event award. In another such embodiment, the triggering gaming device determines the secondary event award. In another such embodiment, one or more individual gaming devices determine the secondary event award. In these embodiments, as described below, the secondary event award is based on the wager amount placed at the triggering gaming device.

In another embodiment, after the secondary event triggering condition occurs, the gaming system disclosed herein enables the players at one or more of the gaming devices to participate in a secondary event. The secondary event may be any suitable game or sequence which results in a secondary event award. In this embodiment, the secondary event award is based on the wager amount placed at the triggering gaming device. In different embodiments, the secondary event may be any suitable type of game including, but not limited to, reel/slot games, card games (e.g., poker, blackjack), lottery games, selection games, offer and acceptance games, wheel games, dice games, free spin games, competition games, skill games or perceived skill games. In one embodiment, the secondary event includes one or more rounds of game play, wherein any awards determined over a plurality of rounds form the secondary event award. In different embodiments, the secondary event each participating gaming device provides is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

As mentioned above, in one such embodiment, the secondary event award is based on the wager amount placed at the triggering gaming device. In another such embodiment, the secondary event award is based, at least in part, on the wager amount placed at the triggering gaming device. In these embodiments, the determined secondary event award is directly proportional to the bet multiple of the triggering gaming device. That is, the gaming system disclosed herein determines an amount or value of a secondary event award (which is subsequently distributed amongst a plurality of players at a plurality of gaming devices in the gaming system) based on a single wager amount at one gaming device (i.e., the triggering gaming device) in the gaming system. For example, if a player wagered a first amount of 50 credits at the triggering gaming device, the secondary event award is based, at least in part, on the first wager amount of 50 credits. In another example, if the player wagered a second amount of 100 credits, the secondary event award is based, at least in part, on the second wager amount of 100 credits. It should be appreciated that such a configuration provides increased excitement and enjoyment for players in the gaming system by providing a shared secondary event award based on the wager amount at one of the gaming devices.

In one embodiment, the secondary event award is determined based on an applicable modifier, such as multiplier, applied to the wager amount placed at the triggering gaming device. For example, utilizing an applicable modifier of 10×, if a player wagered a first amount of 50 credits at the triggering gaming device, the gaming system determines a secondary event award of 500 credits based on the first wager amount of 50 credits. In another example, if the player wagered a second amount of 100 credits, the gaming system determines a secondary event award of 1000 credits is based on the second wager amount of 100 credits. In different embodiments, the applicable multiplier is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In one embodiment, the secondary event award is determined based on the wager amount placed at the triggering gaming device and the accumulated bonus event pool associated with the triggering gaming device. In one such embodiment, the secondary event award is determined based on the wager amount placed at the triggering gaming device and an amount or percentage, if any, which the accumulated bonus event pool associated with the triggering gaming device exceeds a designated threshold level.

In another embodiment, the secondary event award is determined based on the wager amount placed at the triggering gaming device and the accumulated bonus event pools associated with one or more of the gaming devices in the gaming system. In another embodiment, the secondary event award is determined based on the wager amount placed at the triggering gaming device and a primary game outcome generated at the triggering gaming device. In different embodiments, the secondary event award is determined based on the wager amount placed at the triggering gaming device and at least one additional variable or game aspect which is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on time (such as the time of day or a designated time period) or determined based on any other suitable method or criteria.

In an alternative embodiment, the secondary event award is determined, based on a wager placed at the triggering gaming device and the wagers placed at one or more, but not each of the auxiliary gaming devices. In different embodiments, which auxiliary gaming devices the wagers placed at determine part of the secondary event award is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on time (such as the time of day) or determined based on any other suitable method or criteria.

In one embodiment, after a secondary event award is determined, the gaming system provides a portion of the determined secondary event award to the triggering gaming device as indicated in block 306. In one such embodiment, the portion or percentage of the determined secondary event award provided to the player currently playing the triggering gaming device is set or predetermined. In another such embodiment, the portion or percentage of the determined secondary event award provided to the player currently playing the triggering gaming device is based on the accumulated bonus event pool associated with the triggering gaming device. In another such embodiment, the portion of the determined secondary event award provided to the player currently playing the triggering gaming device is based on an amount or percentage, if any, which the accumulated bonus event pool associated with the triggering gaming device exceeds a designated threshold level.

In another such embodiment, the portion of the determined secondary event award provided to the player currently playing the triggering gaming device is based on the amount of the accumulated bonus event pool associated with the triggering gaming device relative to the amounts of the accumulated bonus event pools associated with one or more of the gaming devices in the gaming system. In different embodiments, the portion of the determined secondary event award provided to the player currently playing the triggering gaming device is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's game wager, determined based on time (such as the time of day) or determined based on any other suitable method or criteria.

In one embodiment, part or all of the remaining portion of the determined secondary event award is distributed across one or more of the auxiliary gaming devices in the gaming system as indicated in block 308. That is, this embodiment provides that one or more players at one or more gaming devices in the gaming system (besides the player currently playing the designated triggering gaming device) are provided at least part of the determined secondary event award. Such group gaming features provide increased excitement and enjoyment to players of these gaming devices.

In one embodiment, each of the auxiliary gaming devices in the gaming system are eligible to receive a portion of the determined secondary event award. In another embodiment, a plurality of the auxiliary gaming devices in the gaming system are each eligible to receive a portion of the determined secondary event award. In this embodiment, such plurality of auxiliary gaming devices must qualify, in any suitable manner, to receive a portion of the determined secondary event award. In another embodiment, as described above with reference to determining if a gaming device is provided a chance to participate in the bonus event, the gaming system determines whether each auxiliary gaming device qualifies to receive a portion of the determined secondary event award based on that gaming device's status.

In one embodiment, the portion of the secondary event award provided to each auxiliary gaming device is based on that gaming device's accumulated bonus event pool. In this embodiment, the greater the accumulated bonus event pool associated with an auxiliary gaming device, the greater portion of the secondary event award provided to that auxiliary gaming device. For example, auxiliary gaming device 14*c* (as seen in FIG. 1) has a greater accumulated bonus event pool (i.e., an accumulated bonus event pool of 100 monetary units) than auxiliary gaming device 14*a* (i.e., an accumulated bonus event pool of 50 monetary units) and thus the central controller provides auxiliary gaming device 14*c* a greater portion of the determined secondary event award than auxiliary gaming device 14*a*.

In another such embodiment, the portion of the secondary event award provided to each auxiliary gaming device is based on an amount or percentage, if any, which the accumulated bonus event pool associated with that auxiliary gaming device exceeds a designated threshold level. In different embodiments, the threshold level is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day or a designated time period) or determined based on any other suitable method or criteria.

In another embodiment, the portion of the secondary event award provided to each auxiliary gaming device is based on that gaming device's accumulated bonus event pool relative to a designated amount of accumulated wagers when the secondary event is triggered. In this embodiment, the central server (or one or more individual gaming device processors) determines, for each auxiliary gaming device, a portion or percentage of the secondary event award to provide to the player of that auxiliary gaming device based on that gaming device's accumulated bonus event pool during a designated time period relative to the total amounts wagered on each of the auxiliary gaming devices in the gaming system (i.e., a total accumulated bonus event pool for each of the auxiliary gaming devices in the gaming system) during the designated time period.

In one such embodiment, the central server determines, based on a gaming device's accumulated bonus event pool relative to the total amounts wagered on each of the auxiliary gaming devices in the gaming system, a percentage of the remaining portion of the determined secondary event award to provide to the player of that gaming device. In one example, as seen in FIG. 9, gaming device 14*b* (not shown) is the triggering gaming device and gaming devices 14*a* (with an accumulated bonus event pool of 50 monetary units), 14*c* (with an accumulated bonus event pool of 100 monetary units) and 14*z* (with an accumulated bonus event pool of 5 monetary units) are auxiliary gaming devices. In this example, the total applicable accumulation wager pool for the auxiliary gaming devices is 155 and the percentage of the remainder of the secondary event award for gaming device 14*a* is 50/155 or 32%, for gaming device 14*c* is 100/155 or 65% and for gaming device 14*z* is 5/155 or 3%.

In one embodiment, the central server provides each auxiliary gaming device a portion of the remaining portion of the secondary event award equal to or substantially equal to that auxiliary gaming device's determined percentage. In another embodiment, the central server randomly determines, based on the determined percentage for that auxiliary gaming device, a percentage of the remaining portion of the determined secondary event award to provide to the player of that gaming device. For example, the central server randomly determines that the player currently played gaming device 14*a* is provided 40% of the remaining portion of the secondary event award (as opposed to the determined percentage of 32% for gaming device 14*a*) and the player currently playing gaming device 14*c* is provided 55% of the remaining portion of the secondary event award (as opposed to the determined percentage of 65% for gaming device 14*c*).

In different embodiments, the portion of the secondary event award provided to each auxiliary gaming device is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day or a designated time period) or determined based on any other suitable method or criteria.

In another embodiment, part or all of the remaining portion of the secondary event award may be redistributed and provided to the triggering gaming device as indicated in block 310 of FIG. 8. In one such embodiment, the central server determines whether part or all of the remaining portion of the secondary event award is redistributed to the triggering gaming device based on the accumulated bonus event pool of the triggering gaming device. In another such embodiment, the central server determines, based on the accumulated bonus event pool associated with the triggering gaming device relative to the accumulated bonus event pool associated with one or more of the auxiliary gaming devices, whether part or all of the remaining portion of the secondary event award is redistributed to the triggering gaming device. In another such embodiment, the central server determines whether part or all of the remaining portion of the secondary event award is redistributed to the triggering gaming device based on an amount or percentage, if any, which the accumulated bonus event pool associated with the triggering gaming device exceeds a designated threshold level.

In another embodiment, the central server determines whether part or all of the remaining portion of the secondary event award is redistributed to the triggering gaming device based on the triggering gaming device's accumulated bonus event pool during a designated time period relative to the total amounts wagered on each of the gaming devices in the gaming system during the designated time period. In one such embodiment, the central server determines, for the triggering gaming device and one or more auxiliary gaming devices a percentage of the remaining portion of the determined secondary event award to provide to the player of that gaming device based on each gaming device's accumulated bonus event pool relative to the total amounts wagered on each of the gaming devices in the gaming system. In one example, as seen in FIG. 10, gaming device 14*b* (with an accumulated bonus event pool of 83 monetary units) is the triggering gaming device and gaming devices 14*a* (with an accumulated bonus event pool of 50 monetary units), 14*c* (with an accumulated bonus event pool of 100 monetary units) and 14*z* (with an accumulated bonus event pool of 5 monetary units) are auxiliary gaming devices. In this example, the total applicable accumulation wager pool for the gaming devices in the gaming system is 238 and the percentage of the remaining portion of the secondary event award for auxiliary gaming device 14*a* is 50/238 or 21%, for triggering gaming device 14*b* is 83/238 or 35%, for auxiliary gaming device 14*c* is 100/238 or 42% and for auxiliary gaming device 14*z* is 5/238 or 2%.

In one embodiment, the central server provides each gaming device (including the triggering gaming device) a portion of the remaining portion of the secondary event award equal to or substantially equal to that gaming device's determined percentage. In another embodiment, for each gaming device (including the triggering gaming device), the central server randomly determines, based on the determined percentage, a percentage of the remaining portion of the determined secondary event award to provide to the player of that gaming device. For example, the central server randomly determines that the player currently played triggering gaming device 14*b* is provided 40% of the remaining portion of the secondary event award (as opposed to the determined theoretical percentage of 35% for gaming device 14*a*) in addition to any portion of the secondary event award previously provided to the player at the triggering gaming device.

In another embodiment, part but not all of the remaining portion of the determined secondary event award may be provided to the player of the triggering gaming device. In different embodiments, the amount of the remaining portion of the determined secondary event award which may be provided to the player of the triggering gaming device is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day or a designated time period) or determined based on any other suitable method or criteria.

Figure 11:
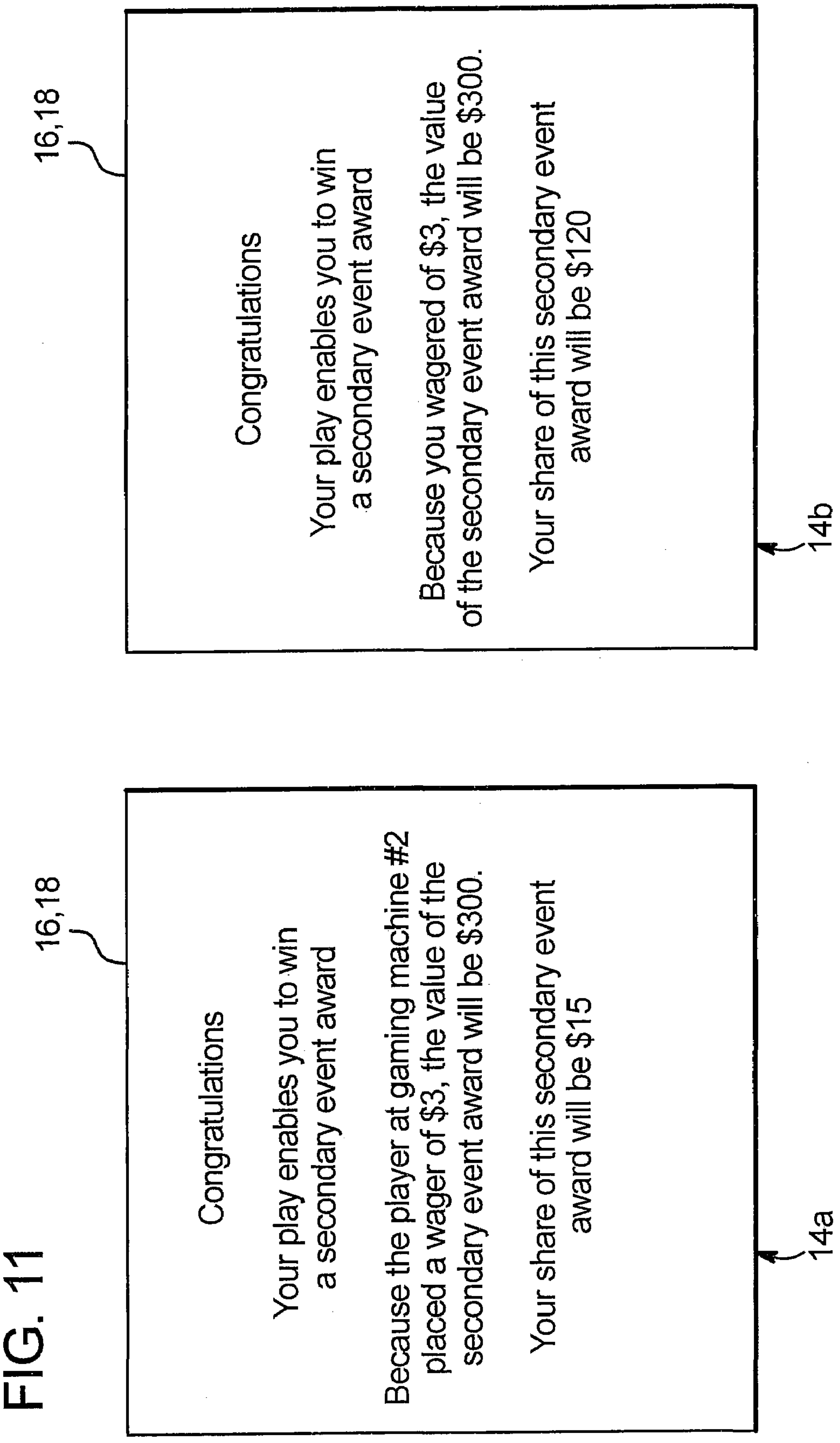
FIG. 11 is a top plan view of one alternative embodiment disclosed herein illustrating two gaming devices displaying information to different players regarding the secondary event award.

In one embodiment, the gaming system is operable to display to one or more players at one or more gaming devices information regarding which player is provided which portion of the secondary event award and why. For example, as seen in FIG. 11, auxiliary gaming device 14*a* displays information to one player (either visually, or through any suitable audio or audiovisual manner) regarding the secondary event award and how the wager amount at a different gaming device determined the value of the secondary event award. In this example, triggering gaming device 14*b* also displays information (either visually, or through any suitable audio or audiovisual manner) to another player regarding the secondary event award and how the wager amount at that gaming device determined the value of the secondary event award to be divided amongst the players at the gaming devices in the gaming system.

In another embodiment, upon an occurrence of a triggering event and a designation of a triggering gaming device and one or more auxiliary gaming devices (as described above), the gaming system disclosed herein combines the accumulated bonus event pools associated with a plurality or each of the auxiliary gaming devices. In one such embodiment, these combined accumulated bonus event pools fund one or more additional awards for one or more players at gaming devices in the gaming system. In another such embodiment, these combined accumulated bonus event pools fund one or more modifiers, such a multipliers, of any awards provided to one or more players at one or more gaming devices in the gaming system. It should be appreciated that in different embodiments, these combined accumulated bonus event pools may be utilized in any suitable manner to fund any suitable game play feature.

In one embodiment, if the combined accumulated bonus event pools fund a plurality of awards for a plurality of players, a player at one gaming device may be selected a plurality of times to provide a plurality of bonus awards. In one such embodiment, if a player is selected a plurality of times, the player is provided a portion of the combined accumulated bonus event pool each time the player is selected. In another such embodiment, if a player is selected a plurality of times, each time the player is selected (after the first selection) increases a multiplier associated any bonus event award the player will be provided.

In one embodiment, the selection of which player(s) at which gaming device(s) are provided these additional awards and/or modifiers that are funded by combined accumulated bonus event pools is determined based on a player's status (such as determined through a player tracking system). In another embodiment, the selection of which player(s) at which gaming device(s) are provided these additional awards and/or modifiers that are funded by combined accumulated bonus event pools is determined based on one or more wagers placed by one or more players. In different embodiments, the selection of which players at which gaming devices are provided these additional awards and/or modifiers that are funded by combined accumulated bonus event pools is predetermined, randomly determined, determined based on a generated symbol or symbol combination, determined based on a random determination by the central controller, determined based on a random determination at the gaming machine, determined based on one or more side wagers placed, determined based on time (such as the time of day), determined based on a player's primary game wager, determined based on the amount of coin-in accumulated in one or more pools, or determined based on any other suitable method or criteria.

Information Provided to Player

As indicated above, the bonus event awards can be completely mystery bonus awards provided to the players of the gaming machines with or without explanation or information provided to the player, or alternatively can be displayed to the player. In one embodiment, suitable information about the bonus event awards can be provided to the players through one or more displays on the gaming machines or additional information displays positioned near the gaming machines, such as above a bank of system gaming machines.

This information can be used to entertain the player or inform the player that a bonus event has occurred or will occur. Examples of such information are:

(1) that a bonus event has occurred;

(2) that a bonus event will shortly occur (i.e., foreshadowing the bonus event);

(3) that a gaming device qualifies to participate in the bonus event;

(4) that a gaming device has not qualified to participate in the bonus event;

(5) that one or more bonus event awards have been provided to one or more players of the system gaming machines;

(6) that one or more bonus event awards will be shortly provided to one or more players of the system gaming machines;

(7) that a player's accumulated bonus event pool is at or near a threshold amount level;

(8) the player's chances or odds of entering the bonus event participation gaming sequence;

(9) the player's chances or odds of a successful outcome in the bonus event participation gaming sequence

(10) the player's chances or odds of obtaining a modifier in the bonus event participation gaming sequence;

(11) the amount of the bonus event awards won;

(12) the amount of the bonus event awards that can be won;

(13) that a gaming device had the highest first bonus event award; and

(14) which progressive award level won.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming machines; and at least one controller configured to communicate with said gaming machines, wherein the at least one controller is programmed to:

(a) identify a plurality of players of said gaming machines;

(b) for each identified player, maintain a distinct accumulated bonus event pool for said identified player, wherein the accumulated bonus event pool maintained for the identified player is based on any wagers placed by the identified player on said gaming machines during a designated period;

(c) determine if a secondary event will occur; and (d) if the secondary event is determined to occur:

(i) designate one of the identified players as a triggering player and designate each of the remaining identified players as auxiliary players, (ii) determine a secondary event award, wherein the determined secondary event award is based, at least in part, on a designated wager placed by the triggering player, (iii) provide a first portion of the determined secondary event award to the triggering player, and (iv) for each auxiliary player:

(A) determine a second portion of the determined secondary event award based on the accumulated bonus event pool maintained for said auxiliary player relative to the wagers placed by at least a plurality of said identified players during the designated period such that if the accumulated bonus event pool maintained for a first auxiliary player is different than the accumulated bonus event pool maintained for a second, different auxiliary player, the determined second portion for the first auxiliary player is different than the determined second portion for the second auxiliary player, and (B) provide the determined second portion to said auxiliary player, wherein for at least one of said auxiliary players, said provided second portion has a value greater than zero.

2. The gaming system of claim 1, wherein the at least one controller is programmed to cause the gaming machine of the triggering player to:

(1) determine a third portion, if any, of the determined secondary event award based on the accumulated bonus event pool maintained for said triggering player relative to the wagers placed by at least each of said identified players during the designated period, and (2) provide the determined third portion, if any, to said triggering player.

3. The gaming system of claim 1, wherein the at least one controller is programmed to determine the second portion of the determined secondary event award based on the accumulated bonus event pool maintained for said auxiliary player relative to the wagers placed for by at least each of said identified players during the bonus event accumulation period.

4. The gaming system of claim 1, wherein the determination that the secondary event will occur is independent of any displayed event in any play of any primary game or of any plays of any secondary game of the gaming machines.

5. The gaming system of claim 1, wherein said plurality of players are identified in association with a player tracking system.

6. A gaming system comprising:

a plurality of gaming machines; and at least one controller configured to communicate with said gaming machines, wherein the at least one controller is programmed to:

(a) identify a plurality of players of said gaming machines;

(b) for each identified player, maintain a distinct accumulated bonus event pool for said identified player, wherein the accumulated bonus event pool maintained for the identified player is based on any wagers placed by the identified player on said gaming machines during a designated period;

(c) determine if a secondary event will occur; and (d) if the secondary event is determined to occur:

(i) designate one of the gaming machines as a triggering gaming machine and designate each of the remaining gaming machines as auxiliary gaming machines, (ii) determine a secondary event award, wherein the determined secondary event award is based, at least in part, on a designated wager placed by the identified player of said triggering gaming machine, (iii) provide a first portion of the determined secondary event award to the identified player of the triggering gaming machine, and (iv) for each auxiliary gaming machine:

(A) determine a second portion of the determined secondary event award based on the accumulated bonus event pool maintained for said identified player of the auxiliary gaming machine relative to the wagers placed for a plurality of said gaming machines during the designated period such that if the accumulated bonus event pool maintained for a first identified player of a first auxiliary gaming machine is different than the accumulated bonus event pool maintained for a second player of a second, different auxiliary gaming machine, the determined second portion for the first player of the first auxiliary gaming machine is different than the determined second portion for the second player of the second auxiliary gaming machine, and (B) provide the determined second portion to said identified player of the auxiliary gaming machine, wherein for at least one of said identified players of at least one of the auxiliary gaming machines, said provided second portion has a value greater than zero.

7. The gaming system of claim 6, wherein the at least one controller is programmed to cause the triggering gaming machine to:

(1) determine a third portion, if any, of the determined secondary event award based on the accumulated bonus event pool maintained for said identified player of the triggering gaming machine relative to the wagers placed for each of said gaming machines during the designated period, and (2) provide the determined third portion, if any, to said player of the triggering gaming machine.

8. The gaming system of claim 6, wherein the at least one controller is programmed to determine the second portion of the determined secondary event award based on the accumulated bonus event pool maintained for said identified player of the auxiliary gaming machine relative to the wagers placed for each of said gaming machines during the bonus event accumulation period.

9. The gaming system of claim 6, wherein the determination that the secondary event will occur is independent of any displayed event in any play of any primary game or of any plays of any secondary game of the gaming machines.

10. The gaming system of claim 6, wherein said plurality of players are identified in association with a player tracking system.

11. A method of operating a gaming system, said method comprising:

(a) identifying a plurality of players of a plurality of gaming machines;

(b) for each identified player, maintaining a distinct accumulated bonus event pool for said identified player, wherein the accumulated bonus event pool maintained for the identified player is based on any wagers placed by the identified player on said gaming machines during a designated period;

(c) determining if a secondary event will occur; and (d) if the secondary event is determined to occur:

(i) designating one of the identified players as a triggering player and designate each of the remaining identified players as auxiliary players, (ii) determining a secondary event award, wherein the determined secondary event award is based, at least in part, on a designated wager placed by the triggering player, (iii) providing a first portion of the determined secondary event award to the triggering player, and (iv) for each auxiliary player:

(A) determining a second portion of the determined secondary event award based on the accumulated bonus event pool maintained for said auxiliary player relative to the wagers placed by at least a plurality of said identified players during the designated period such that if the accumulated bonus event pool maintained for a first auxiliary player is different than the accumulated bonus event pool maintained for a second, different auxiliary player, the determined second portion for the first auxiliary player is different than the determined second portion for the second auxiliary player, and (B) providing the determined second portion to said auxiliary player, wherein for at least one of said auxiliary players, said provided second portion has a value greater than zero.

12. The method of claim 11, which includes causing the gaming machine of the triggering player to:

(1) determine a third portion, if any, of the determined secondary event award based on the accumulated bonus event pool maintained for said triggering player relative to the wagers placed by at least each of said identified players during the designated period, and (2) provide the determined third portion, if any, to said triggering player.

13. The method of claim 11, which includes determining the second portion of the determined secondary event award based on the accumulated bonus event pool maintained for said auxiliary player relative to the wagers placed for by at least each of said identified players during the bonus event accumulation period.

14. The method of claim 11, wherein the determination that the secondary event will occur is independent of any displayed event in any play of any primary game or of any plays of any secondary game of the gaming machines.

15. The method of claim 11, which includes identifying said plurality of players in association with a player tracking system.

16. The method of claim 11, which is provided via a data network.

17. The method of claim 16, wherein said data network is an internet.

18. A method of operating a gaming system, said method comprising:

(a) identifying a plurality of players of a plurality of gaming machines;

(b) for each identified player, maintaining a distinct accumulated bonus event pool for said identified player, wherein the accumulated bonus event pool maintained for the identified player is based on any wagers placed by the identified player on said gaming machines during a designated period;

(c) determining if a secondary event will occur; and (d) if the secondary event is determined to occur:

(i) designating one of the gaming machines as a triggering gaming machine and designate each of the remaining gaming machines as auxiliary gaming machines, (ii) determining a secondary event award, wherein the determined secondary event award is based, at least in part, on a designated wager placed by the identified player of said triggering gaming machine, (iii) providing a first portion of the determined secondary event award to the identified player of the triggering gaming machine, and (iv) for each auxiliary gaming machine:

(A) determining a second portion of the determined secondary event award based on the accumulated bonus event pool maintained for said identified player of the auxiliary gaming machine relative to the wagers placed for a plurality of said gaming machines during the designated period such that if the accumulated bonus event pool maintained for a first identified player of a first auxiliary gaming machine is different than the accumulated bonus event pool maintained for a second player of a second, different auxiliary gaming machine, the determined second portion for the first player of the first auxiliary gaming machine is different than the determined second portion for the second player of the second auxiliary gaming machine, and (B) providing the determined second portion to said identified player of the auxiliary gaming machine, wherein for at least one of said identified players of at least one of the auxiliary gaming machines, said provided second portion has a value greater than zero.

19. The method tem of claim 18, which includes causing the triggering gaming machine to:

(1) determine a third portion, if any, of the determined secondary event award based on the accumulated bonus event pool maintained for said identified player of the triggering gaming machine relative to the wagers placed for each of said gaming machines during the designated period, and (2) provide the determined third portion, if any, to said player of the triggering gaming machine.

20. The method of claim 18, which includes determining the second portion of the determined secondary event award based on the accumulated bonus event pool maintained for said identified player of the auxiliary gaming machine relative to the wagers placed for each of said gaming machines during the bonus event accumulation period.

21. The method of claim 18, wherein the determination that the secondary event will occur is independent of any displayed event in any play of any primary game or of any plays of any secondary game of the gaming machines.

22. The method of claim 18, which includes identifying said plurality of players in association with a player tracking system.

23. The method of claim 18, which is provided via a data network.

24. The method of claim 23, wherein said data network is an internet.

* * * * *

UNITED STATES PATENT AND TRADEMARK OFFICE

CERTIFICATE OF CORRECTION

PATENT NO. : 7,713,124 B2
APPLICATION NO. : 11/830044
DATED : May 11, 2010
INVENTOR(S) : Cuddy et al.

It is certified that error appears in the above-identified patent and that said Letters Patent is hereby corrected as shown below:

IN THE CLAIMS:

In Claim 3, Column 61, line 1, delete “for”.

In Claim 3, Column 61, lines 2 and 3, replace “the bonus event accumulation period” with --the designated period--.

In Claim 8, Column 62, lines 6 and 7, replace “the bonus event accumulation period” with --the designated period--.

In Claim 13, Column 62, line 65, delete “for”.

In Claim 13, Column 62, lines 66 and 67, replace “the bonus event accumulation period” with --the designated period--.

In Claim 20, Column 64, line 30, replace “the bonus event accumulation period” with --the designated period--.

Signed and Sealed this

Third Day of August, 2010

David J. Kappos

David J. Kappos
*Director of the United States Patent and Trademark Office*